(12) United States Patent
Poon et al.

(10) Patent No.: US 9,589,535 B2
(45) Date of Patent: Mar. 7, 2017

(54) SOCIAL MOBILE GAME FOR RECOMMENDING ITEMS

(71) Applicant: PayPal, Inc., San Jose, CA (US)

(72) Inventors: Amy Poon, Pleasanton, CA (US); Margaret Szeto, Mountain View, CA (US); Konstantin Orlov, Santa Clara, CA (US); Varghese Mathai, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 202 days.

(21) Appl. No.: 13/946,584

(22) Filed: Jul. 19, 2013

(65) Prior Publication Data

US 2015/0024840 A1 Jan. 22, 2015

(51) Int. Cl.
| | |
|---|---|
| G09G 5/14 | (2006.01) |
| G06Q 30/06 | (2012.01) |
| A63F 13/655 | (2014.01) |
| A63F 13/795 | (2014.01) |
| A63F 13/332 | (2014.01) |
| A63F 13/53 | (2014.01) |

(52) U.S. Cl.
CPC ............. *G09G 5/14* (2013.01); *A63F 13/332* (2014.09); *A63F 13/53* (2014.09); *A63F 13/655* (2014.09); *A63F 13/795* (2014.09); *G06Q 30/0631* (2013.01); *G09G 2340/12* (2013.01)

(58) Field of Classification Search
CPC ....................................................... A63F 9/12
See application file for complete search history.

(56) References Cited

U.S. PATENT DOCUMENTS

| | | | | |
|---|---|---|---|---|
| 2,465,971 | A | * | 3/1949 | Leblang ........................ 446/92 |
| 2,931,657 | A | * | 4/1960 | Lewis .......................... 273/155 |
| 3,252,243 | A | * | 5/1966 | Doyle et al. .................. 446/98 |
| 3,717,942 | A | * | 2/1973 | Presby ......................... 434/402 |
| 5,605,332 | A | * | 2/1997 | Harnett ..................... 273/157 R |
| 6,146,721 | A | * | 11/2000 | Freynet ........................... 428/7 |
| 6,244,926 | B1 | * | 6/2001 | George et al. ............... 446/391 |
| 6,363,388 | B1 | | 3/2002 | Sprenger et al. |
| 6,561,417 | B1 | | 5/2003 | Gadd |
| 6,567,797 | B1 | | 5/2003 | Schuetze et al. |

(Continued)

OTHER PUBLICATIONS

"AgingBooth—Android Apps on Google Play", [Online]. Retrieved from the Internet: <URL: https://play.google.com/store/apps/details?id=com.piviandco.agingbooth&hl=en>, (Accessed May 3, 2013), 2 pgs.

(Continued)

*Primary Examiner* — Jason Skaarup
(74) *Attorney, Agent, or Firm* — Maschoff Brennan

(57) ABSTRACT

Disclosed is a social dress up game that may be a fun mobile app that may be played collaboratively with friends, using the photo capability of a mobile phone or smart mobile device. One player will separately take a picture of a friend, and then invite two friends to join. Each player will dress up one part or component of the whole body of the photo—head, body or legs. In the end, the three different parts will be merged into an interesting and unique image of their friend that they can also share with the game players. Since each game player would have worked on only that player's component, the resulting merged image will be a surprise to all players.

20 Claims, 19 Drawing Sheets

(56) References Cited

U.S. PATENT DOCUMENTS

| | | | |
|---|---|---|---|
| 6,970,101 B1 | 11/2005 | Squire et al. | |
| 7,143,089 B2 | 11/2006 | Petras et al. | |
| 7,363,214 B2 | 4/2008 | Musgrove et al. | |
| 7,519,562 B1 | 4/2009 | Vander Mey et al. | |
| 7,568,004 B2 | 7/2009 | Gottfried | |
| 7,587,359 B2 | 9/2009 | Levy et al. | |
| 7,689,916 B1 | 3/2010 | Goel et al. | |
| 7,712,035 B2 | 5/2010 | Giannini | |
| 7,752,082 B2 | 7/2010 | Calabria | |
| 7,756,757 B1 | 7/2010 | Oakes, III | |
| 7,761,339 B2 | 7/2010 | Alivandi | |
| 7,827,074 B1 | 11/2010 | Rolf | |
| 7,878,891 B2* | 2/2011 | Chiu | 463/9 |
| 8,127,253 B2 | 2/2012 | Sauve et al. | |
| 8,166,040 B2 | 4/2012 | Brindisi et al. | |
| 8,280,959 B1 | 10/2012 | Zuckerberg et al. | |
| 8,628,087 B2* | 1/2014 | Knowlton et al. | 273/157 R |
| 2001/0044751 A1 | 11/2001 | Pugliese, III et al. | |
| 2002/0002504 A1 | 1/2002 | Engel et al. | |
| 2002/0174021 A1 | 11/2002 | Chu et al. | |
| 2002/0178014 A1 | 11/2002 | Alexander et al. | |
| 2003/0004831 A1 | 1/2003 | Owens | |
| 2003/0028873 A1 | 2/2003 | Lemmons | |
| 2003/0200159 A1 | 10/2003 | Kay et al. | |
| 2005/0174591 A1 | 8/2005 | Sowinski et al. | |
| 2006/0058948 A1 | 3/2006 | Blass et al. | |
| 2006/0085270 A1 | 4/2006 | Ruckart | |
| 2006/0113383 A1 | 6/2006 | Scott et al. | |
| 2006/0149625 A1 | 7/2006 | Koningstein | |
| 2006/0218153 A1 | 9/2006 | Voon et al. | |
| 2006/0265234 A1 | 11/2006 | Peterkofsky et al. | |
| 2007/0150369 A1 | 6/2007 | Zivin | |
| 2007/0198505 A1 | 8/2007 | Fuller | |
| 2007/0290037 A1 | 12/2007 | Arellanes et al. | |
| 2008/0046956 A1 | 2/2008 | Kulas | |
| 2008/0059970 A1 | 3/2008 | Gonen | |
| 2008/0114807 A1 | 5/2008 | Sembower | |
| 2008/0162157 A1 | 7/2008 | Daniluk | |
| 2008/0176545 A1 | 7/2008 | Dicke et al. | |
| 2008/0186226 A1 | 8/2008 | Ratnakar | |
| 2008/0208852 A1 | 8/2008 | Kuttikkad et al. | |
| 2008/0285940 A1 | 11/2008 | Kulas | |
| 2009/0006208 A1 | 1/2009 | Grewal et al. | |
| 2009/0019487 A1 | 1/2009 | Kulas | |
| 2009/0055199 A1 | 2/2009 | Yusuf et al. | |
| 2009/0083096 A1 | 3/2009 | Cao et al. | |
| 2009/0115777 A1 | 5/2009 | Reyers Moreno | |
| 2009/0144624 A1 | 6/2009 | Barnes, Jr. | |
| 2009/0228342 A1 | 9/2009 | Walker et al. | |
| 2009/0258687 A1* | 10/2009 | Weichselbaum | 463/9 |
| 2009/0265639 A1 | 10/2009 | Shuster | |
| 2009/0271293 A1 | 10/2009 | Parkhurst et al. | |
| 2009/0299819 A1 | 12/2009 | Davis, III et al. | |
| 2009/0299824 A1 | 12/2009 | Barnes, Jr. | |
| 2009/0319373 A1 | 12/2009 | Barrett | |
| 2009/0319436 A1 | 12/2009 | Andra et al. | |
| 2010/0049663 A1 | 2/2010 | Kane, Jr. et al. | |
| 2010/0070382 A1 | 3/2010 | Inghelbrecht et al. | |
| 2010/0094729 A1 | 4/2010 | Gray et al. | |
| 2010/0145719 A1 | 6/2010 | Williams et al. | |
| 2010/0145790 A1 | 6/2010 | Brignull et al. | |
| 2010/0153378 A1 | 6/2010 | Sardesai | |
| 2010/0191770 A1* | 7/2010 | Cho | G06Q 30/02 707/783 |
| 2010/0198700 A1 | 8/2010 | Ramaswamy et al. | |
| 2010/0211900 A1 | 8/2010 | Fujioka | |
| 2010/0268661 A1 | 10/2010 | Levy et al. | |
| 2010/0281029 A1 | 11/2010 | Parikh et al. | |
| 2010/0332283 A1 | 12/2010 | Ng et al. | |
| 2011/0004517 A1 | 1/2011 | Soto et al. | |
| 2011/0040655 A1 | 2/2011 | Hendrickson et al. | |
| 2011/0078305 A1 | 3/2011 | Varela | |
| 2011/0106589 A1 | 5/2011 | Blomberg et al. | |
| 2011/0173191 A1 | 7/2011 | Tsaparas et al. | |
| 2011/0184780 A1* | 7/2011 | Alderson | G06Q 30/0643 705/27.2 |
| 2011/0202394 A1 | 8/2011 | Borom et al. | |
| 2011/0238478 A1 | 9/2011 | Gottfurcht et al. | |
| 2011/0246329 A1 | 10/2011 | Geisner et al. | |
| 2011/0298897 A1* | 12/2011 | Sareen | G06N 3/006 348/47 |
| 2012/0022978 A1 | 1/2012 | Manea et al. | |
| 2012/0084812 A1 | 4/2012 | Thompson et al. | |
| 2012/0130792 A1 | 5/2012 | Polk, Jr. et al. | |
| 2012/0150436 A1 | 6/2012 | Rossano et al. | |
| 2012/0166322 A1 | 6/2012 | Simon et al. | |
| 2012/0185330 A1 | 7/2012 | Kleinrock et al. | |
| 2012/0197764 A1 | 8/2012 | Nuzzi et al. | |
| 2012/0203614 A1 | 8/2012 | Chen et al. | |
| 2012/0203639 A1 | 8/2012 | Webster et al. | |
| 2012/0235817 A1 | 9/2012 | Forster | |
| 2012/0239513 A1* | 9/2012 | Oliver et al. | 705/14.73 |
| 2012/0253908 A1 | 10/2012 | Ouimet et al. | |
| 2012/0303479 A1 | 11/2012 | Derks et al. | |
| 2012/0313969 A1* | 12/2012 | Szymczyk et al. | 345/633 |
| 2013/0030955 A1 | 1/2013 | David et al. | |
| 2013/0071816 A1* | 3/2013 | Singh et al. | 434/81 |
| 2013/0124189 A1 | 5/2013 | Baldwin et al. | |
| 2013/0132221 A1 | 5/2013 | Bradford et al. | |
| 2013/0185679 A1* | 7/2013 | Fretwell et al. | 715/862 |
| 2013/0191723 A1 | 7/2013 | Pappas et al. | |
| 2013/0198002 A1 | 8/2013 | Nuzzi et al. | |
| 2013/0244784 A1* | 9/2013 | Assa | 463/40 |
| 2014/0006389 A1 | 1/2014 | Garcia et al. | |
| 2014/0067564 A1 | 3/2014 | Yuan et al. | |
| 2014/0176565 A1* | 6/2014 | Adeyoola et al. | 345/473 |
| 2014/0213333 A1* | 7/2014 | Hanes et al. | 463/9 |
| 2014/0282114 A1 | 9/2014 | Walkin et al. | |
| 2016/0048905 A1 | 2/2016 | Yuan et al. | |

OTHER PUBLICATIONS

"Draw Something", [Online]. Retrieved from the Internet: <URL: http://omgpop.com/drawsomething>, (Accessed May 3, 2013), 1 pg.

"Facebook Gives POLITICO Access to Your Political Beliefs", © 2012 Ology, [online]. Retrieved from the Internet: <URL: http://www.ology.com/post/51413/facebook-gives-politico-access-to-your-political-beliefs>, (Accessed Jun. 28, 2012), 4 pgs.

Newby, Joe, "Facebook, Politico to measure sentiment of GOP candidates by collecting posts", © 2006-2012 Clarity Digital Group LLC d/b/a Examiner.com., [online]. Retrieved from the Internet: <URL: http://www.examiner.com/computer-user-in-national/facebook-to-measure-sentiment-of-gop-candidates-by-collecting-users-posts>, (Accessed Jun. 28, 2012), 3 pgs.

Sifry, Micah L, "Politico-Facebook Sentiment Analysis Will Generate Bogus Results, Expert Says", © 2012 Personal Democracy Media., [online]. Retrieved from the Internet: <URL: http://techpresident.com/news/21618/politico-facebook-sentiment-analysis-bogus>, (Jan. 13, 2012), 3 pgs.

"Exquisite Corpse", Wikipedia, [Online]. Retrieved from the Internet: <URL: http://en.wikipedia.org/wiki/Exquisite_corpse>, (Accessed Jun. 11, 2014), 3 pgs.

"U.S. Appl. No. 13/011,324, Advisory Action mailed Feb. 18, 2016", 3 pgs.

"U.S. Appl. No. 13/011,324, Final Office Action mailed Sep. 30, 2015", 24 pgs.

"U.S. Appl. No. 13/011,324, Non Final Office Action mailed Apr. 22, 2016", 26 pgs.

"U.S. Appl. No. 13/011,324, Response filed Dec. 30, 2015 to Final Office Action mailed Sep. 30, 2015", 22 pgs.

"U.S. Appl. No. 13/539,379, Response filed Nov. 5, 2015 to Final Office Action mailed Jun. 17, 2015", 16 pgs.

* cited by examiner

SOCIAL MOBILE GAME FOR RECOMMENDING ITEMS

TECHNICAL FIELD

The present application relates generally to the technical field of mobile social game apps for dressing a photo, image, avatar or the like with various clothing for possible purchase or simply for entertainment.

BACKGROUND

Social mobile games that users may play collaboratively with friends from, in one embodiment, a mobile phone or smart mobile device, are becoming increasingly popular. Mobile games may played by a number of players. Social mobile games may take advantage of products available online, such as clothing as well as other items. Such items may be suggested in relation to images that illustrate the function of the items. Such games may also enable such items to be located in nearby stores or online, or may be used to organize a group gift.

BRIEF DESCRIPTION OF THE DRAWINGS

Some embodiments are illustrated by way of example and not limitation in the figures of the accompanying drawings in which.

DETAILED DESCRIPTION

Figure 1:
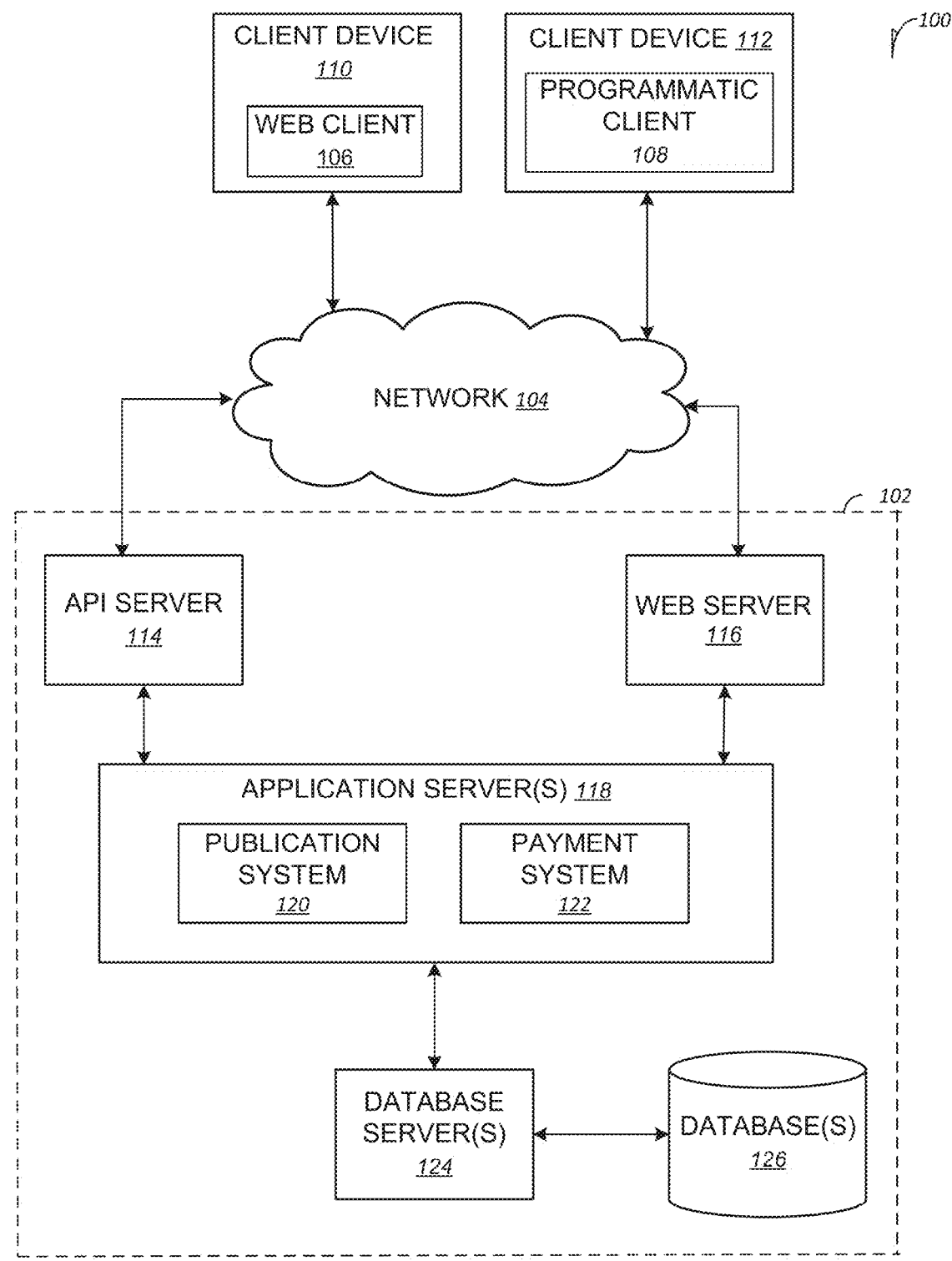
FIG. 1 is a block diagram illustrating a network system, according to example embodiments.

Disclosed is a social dress up game that may be a fun mobile app that may be played collaboratively with friends from, in one embodiment, using the photo capability of a mobile phone or smart mobile device. The game may inspire fun interactions amongst friends that may lead to local shopping or group gifting. Shopping need not be local, but could also be by using an online ecommerce system. The outfit pictures may, in some instances be humorous outfit pictures of a person who is the subject of the game. In any event, the resulting outfit picture may be shared on social streams to raise brand awareness, in an example embodiment, of an ecommerce system such as eBay®. The mobile app may encourage use anytime, anywhere, and is easy to scale to other types of products and spaces. For ease of reference herein, the name of the game may be referred to as Stylista™, although it will be recognized that the game may be given any name.

The game may be played by a number of players or, perhaps, teams of players. In one embodiment, up to three players or three teams may play. First, one player will separately take a picture of a friend, and then invite two friends to join. Each player will dress up one part or component of the whole body of the photo—head, body or legs. In the end, the three different parts will be merged into an interesting and unique image of their friend that they can also share with the game players. Since each game player would have worked on only that player's component, the resulting merged image will be a surprise to all players. The result may also be shared with other friends. In example embodiments the dressed up items may be located in local stores based on the current locations of the players or, in some instances, the current locations of the other friends with whom the merged image is shared. The items may also be located from online ecommerce sites. If desired, the players may organize a group gift. Or, the game may simply be used for entertainment, perhaps providing humor, thus enhancing the experience of playing the game, perhaps dramatically because the players never know how the merged image will unfold in the end. Therefore there is not only the aspect of stylistic dress up and brand awareness, but also the underlying gamification that adds additional interest.

Although embodiments are discussed in terms of three players, those of ordinary skill in the art will readily recognize that fewer or more players may participate depending on the intent of the game, the type of item being illustrated which could be, for example, other than clothing, and the illustration instead of being an image divided into three parts may be a more complex image that would be divided into more than three parts for playing the game.

As one example, feedback, for example, as to sentiment about the game or the products recommended, may be given by users, who may be a buyer, as a numeric scale from 1 to 5, where 1 may be low satisfaction and 5 may be high satisfaction. But the actual scale from 1 to 5 (for example, what level of satisfaction is a 2, what level of satisfaction is a 3, what level of satisfaction is a 4, etc.) it is left to user interpretation.

In one example embodiment, where clothing is being suggested for a person, a player may start the game by taking a picture of a friend and selecting a pose/silhouette that resembles the pose of the friend in the picture. The picture is separated into multiple parts (e.g., the head, torso, and legs/feet). Friends are then invited, by way of a social network, to join the game, with each friend being assigned (or selecting) one of the multiple parts of the picture.

Each player may dress-up one part of the person shown in the picture (such as the head, torso or legs/feet). For example, one player selects sunglasses, a necklace, and a hat for the head portion; a second player selects a jacket or shirt for the torso portion; and a third player selects pants and shoes for the legs/feet portion. In one embodiment, each player makes his or her fashion selections independently of the other players. Alternatively, the selections could be made collaboratively. After each player takes their turn, the three different portions of the picture are merged into single unique picture of their friend. The game players can share the unique picture with other friends through social networks. The display of selected fashion items in the picture are adjusted, as needed, based on the earlier selected pose/silhouette (e.g., a front view or a side view of a jacket is applied to the picture based on the selected pose/silhouette).

A social mobile game app such as discussed herein may be implemented using a network based publication system for providing items for illustration, such as clothing for the photograph of a person as discussed above. The publication system may also provide access to social networks for playing the game, as discussed below.

Additionally, the game may identify local and online listings for items similar to those included in the unique picture along with item pricing information. The local listings are based on the application's knowledge of the mobile device's geographic location. The multiple players (as well as other users) may contribute to a gift purchase for some or all of the items in the unique picture.

FIG. 1 is a network diagram depicting a network system 100, according to one embodiment, having a client-server architecture configured for exchanging data over a network. For example, the network system 100 may include a network-based publisher 102 where clients may communicate and exchange data within the network system 100. The data may pertain to various functions (e.g., online item purchases) and aspects (e.g., managing content) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet, wireless network, cellular network, or a Wide Area Network (WAN)) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user profiles; user attributes; product attributes; product and service reviews; product, service, manufacture, and vendor recommendations and identifiers; social network commentary, product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the network-based publisher 102.

Turning specifically to the network-based publisher 102, an application program interface (API) server 114 and a web server 116 are coupled to, and provide programmatic and web interfaces respectively to, one or more application servers 118. The application servers 118 host one or more publication application(s) of publication system 120 and one or more payment systems 122. The application server(s) 118 are, in turn, shown to be coupled to one or more database server(s) 124 that facilitate access to one or more database(s) 126.

In one embodiment, the web server 116 and the API server 114 communicate and receive data pertaining to products, listings, transactions, social network commentary and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., client application 108) running on another client device (e.g., client device 112).

The publication system 120 publishes content on a network (e.g., the Internet). As such, the publication system 120 provides a number of publication and marketplace functions and services to users that access the network-based publisher 102. For example, the publication application(s) of publication system 120 may provide a number of services and functions to users for listing goods and/or services for sale, facilitating transactions, and reviewing and providing feedback about transactions and associated users. Additionally, the publication application(s) of publication system 120 may track and store data and metadata relating to products, listings, transactions, and user interaction with the network-based publisher 102. The publication application(s) of publication system 120 may aggregate the tracked data and metadata to perform data mining to identify trends or patterns in the data. While the publication system 120 may be discussed in terms of a marketplace environment, it may be noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal account, or credit card) for purchases of items via the network-based marketplace. While the publication system 120 and the payment system 122 are shown in FIG. 1 to both form part of the network-based publisher 102, it will be appreciated that, in alternative embodiments, the payment system 122 may form part of a payment service that may be separate and distinct from the network-based publisher 102.

Application Server(s)

Figure 2:
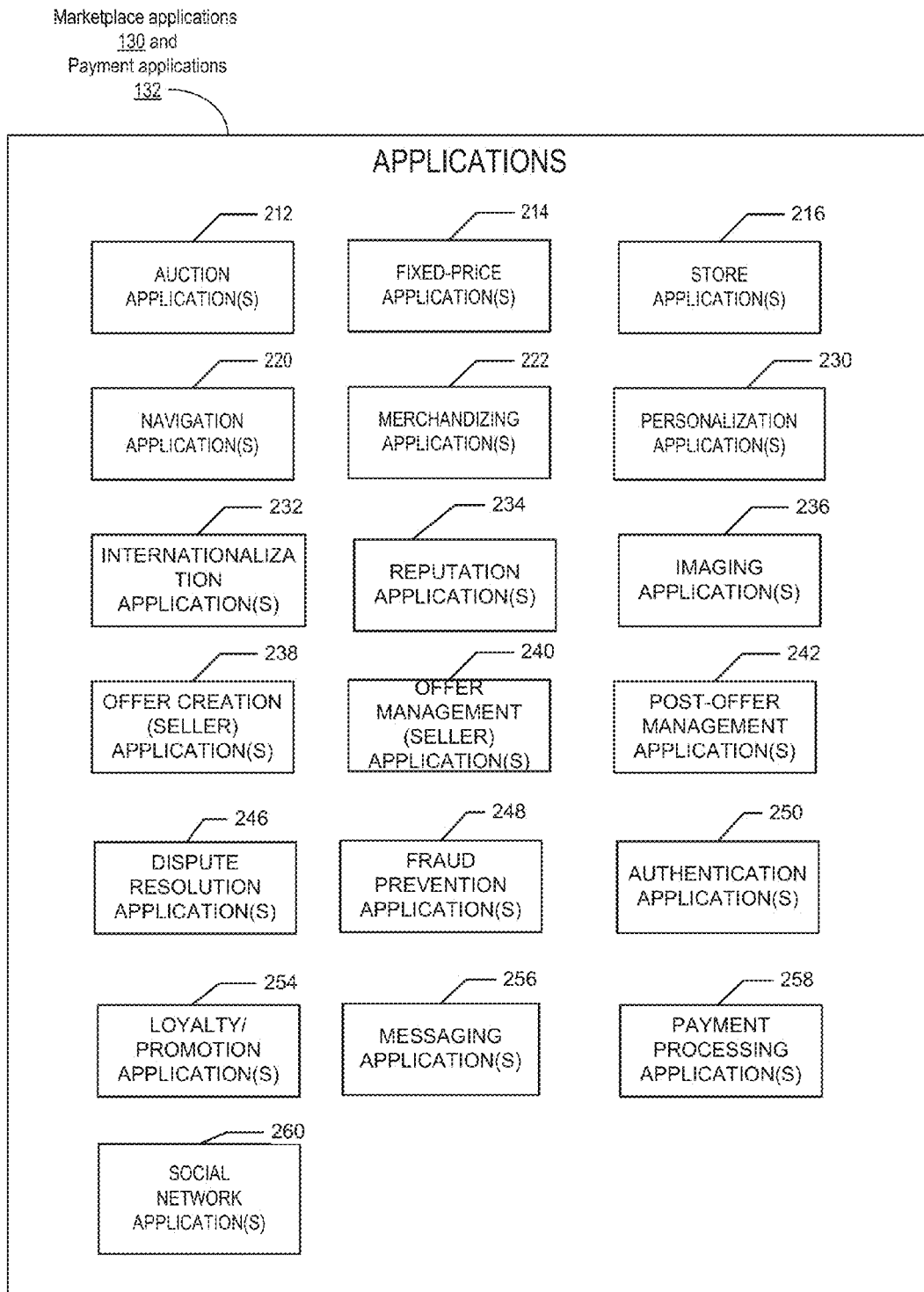
FIG. 2 is a block diagram of application servers that may form a part of the network system of FIG. 1, according to example embodiments.

FIG. 2 illustrates a block diagram showing applications of application server(s) that are part of the network system 100, in an example embodiment. In this embodiment, the publication system 120, and the payment system 120 may be hosted by the application server(s) 118 of the network system 100. The publication system 120 and the payment system 132 may be hosted on dedicated or shared server machines (not shown) that are communicatively coupled to enable communications between server machines. The applications themselves may be communicatively coupled (e.g., via appropriate interfaces) to each other and to various data sources, so as to allow information to be passed between the applications or so as to allow the applications to share and access common data.

The publication system 120 are shown to include at least one or more auction application(s) 212 which support auction-format listing and price setting mechanisms (e.g., English, Dutch, Vickrey, Chinese, Double, Reverse auctions etc.). The auction application(s) 212 may also provide a number of features in support of such auction-format listings, such as a reserve price feature whereby a seller may specify a reserve price in connection with a listing and a proxy-bidding feature whereby a bidder may invoke automated proxy bidding. The auction-format offer in any format may be published in any virtual or physical marketplace medium and may be considered the point of sale for the commerce transaction between a seller and a buyer (or two users).

One or more fixed-price application(s) 214 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, Calif.) may be offered in conjunction with auction-format listings, and allow a buyer to purchase goods or services, which are also being offered for sale via an auction, for a fixed-price that may be typically higher than the starting price of the auction.

The application(s) of the application server(s) 118 may include one or more store application(s) 216 that allow a seller to group listings within a "virtual" store. The virtual store may be branded and otherwise personalized by and for the seller. Such a virtual store may also offer promotions, incentives and features that are specific and personalized to a relevant seller.

Navigation of the online marketplace may be facilitated by one or more navigation application(s) 220. For example, a search application (as an example of a navigation application) may enable key word searches of listings published via the network-based publisher 102. A browse application may allow users to browse various category, catalogue, or inventory data structures according to which listings may be classified within the network-based publisher 102. Various other navigation applications may be provided to supplement the search and browsing applications.

Merchandizing application(s) 222 support various merchandising functions that are made available to sellers to enable sellers to increase sales via the network-based publisher 102. The merchandising application(s) 222 also operate the various merchandising features that may be invoked by sellers, and may monitor and track the success of merchandising strategies employed by sellers.

Personalization application(s) 230 allow users of the network-based publisher 102 to personalize various aspects of their interactions with the network-based publisher 102. For example, a user may, utilizing an appropriate personalization application 230, create a personalized reference page at which information regarding transactions to which the user may be (or has been) a party may be viewed. Further, the personalization application(s) 230 may enable a third party to personalize products and other aspects of their interactions with the network-based publisher 102 and other parties, or to provide other information, such as relevant business information about themselves.

The publication system 120 may include one or more internationalization application(s) 232. In one embodiment, the network-based publisher 102 may support a number of marketplaces that are customized, for example, for specific geographic regions. A version of the network-based publisher 102 may be customized for the United Kingdom, whereas another version of the network-based publisher 102 may be customized for the United States. Each of these versions may operate as an independent marketplace, or may be customized (or internationalized) presentations of a common underlying marketplace. The network-based publisher 102 may accordingly include a number of internationalization application(s) 232 that customize information (and/or the presentation of information) by the network-based publisher 102 according to predetermined criteria (e.g., geographic, demographic or marketplace criteria). For example, the internationalization application(s) 232 may be used to support the customization of information for a number of regional websites that are operated by the network-based publisher 102 and that are accessible via respective web servers.

Reputation application(s) 234 allow users that transact, utilizing the network-based publisher 102, to establish, build and maintain reputations, which may be made available and published to potential trading partners. Consider that where, for example, the network-based publisher 102 supports person-to-person trading, users may otherwise have no history or other reference information whereby the trustworthiness and credibility of potential trading partners may be assessed. The reputation application(s) 234 allow a user, for example through feedback provided by other transaction partners, to establish a reputation within the network-based publisher 102 over time. Other potential trading partners may then reference such a reputation for the purposes of assessing credibility and trustworthiness.

In order to make listings, available via the network-based publisher 102, as visually informing and attractive as possible, the publication system 120 may include one or more imaging application(s) 236 utilizing which users may upload images for inclusion within listings. An imaging application 236 also operates to incorporate images within viewed listings. The imaging application(s) 236 may also support one or more promotional features, such as image galleries that are presented to potential buyers. For example, sellers may generally pay an additional fee to have an image included within a gallery of images for promoted items.

The publication system 120 may include one or more offer creation application(s) 238. The offer creation application(s) 238 allow sellers conveniently to author products pertaining to goods or services that they wish to transact via the network-based publisher 102. Offer management application(s) 240 allow sellers to manage offers, such as goods, services, or donation opportunities. Specifically, where a particular seller has authored and/or published a large number of products, the management of such products may present a challenge. The offer management application(s) 240 provide a number of features (e.g., auto-reproduct, inventory level monitors, etc.) to assist the seller in managing such products. One or more post-offer management application(s) 242 also assist sellers with a number of activities that typically occur post-offer. For example, upon completion of an auction facilitated by one or more auction application(s) 212, a seller may wish to leave feedback regarding a particular buyer. To this end, a post-offer management application 242 may provide an interface to one or more reputation application(s) 234, so as to allow the seller conveniently to provide feedback regarding multiple buyers to the reputation application(s) 234.

The dispute resolution application(s) 246 may provide mechanisms whereby disputes arising between transacting parties may be resolved. For example, the dispute resolution application(s) 246 may provide guided procedures whereby the parties are guided through a number of steps in an attempt to settle a dispute. In the event that the dispute cannot be settled via the guided procedures, the dispute may be escalated to a mediator or arbitrator.

The fraud prevention application(s) 248 may implement various fraud detection and prevention mechanisms to reduce the occurrence of fraud within the network-based publisher 102. The fraud prevention application(s) may prevent fraud with respect to the third party and/or the client user in relation to any part of the request, payment, information flows and/or request fulfillment. Fraud may occur with respect to unauthorized use of financial instruments, non-delivery of goods, and abuse of personal information.

Authentication application(s) 250 may verify the identity of a user, and may be used in conjunction with the fraud prevention application(s) 248. The user may be requested to submit verification of identity, an identifier upon making the purchase request, for example. Verification may be made by a code entered by the user, a cookie retrieved from the device, a phone number/identification pair, a username/password pair, handwriting, and/or biometric methods, such as voice data, face data, iris data, finger print data, and hand data. In some embodiments, the user may not be permitted to login without appropriate authentication. The system (e.g., the FSP) may automatically recognize the user, based upon the particular network-based device used and a retrieved cookie, for example.

The network-based publisher 102 itself, or one or more parties that transact via the network-based publisher 102, may operate loyalty programs and other types of promotions that are supported by one or more loyalty/promotions application(s) 254. For example, a buyer/client user may earn loyalty or promotions points for each transaction established and/or concluded with a particular seller/third party, and may be offered a reward for which accumulated loyalty points can be redeemed.

The application server(s) 118 may include messaging application(s) 256. The messaging application(s) 256 are responsible for the generation and delivery of messages to client users and third parties of the network-based publisher 102. Information in these messages may be pertinent to services offered by, and activities performed via, the payment system 120. Such messages, for example, advise client users regarding the status of products (e.g., providing "out of stock" or "outbid" notices to client users) or payment status (e.g., providing invoice for payment, Notification of a Payment Received, delivery status, invoice notices). Third parties may be notified of a product order, payment confirmation and/or shipment information. Respective messaging application(s) 256 may utilize any one of a number of message delivery networks and platforms to deliver messages to users. For example, messaging application(s) 256 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

The payment system 120 may include one or more payment processing application(s) 258. The payment processing application(s) 258 may receive electronic invoices from the merchants and may receive payments associated with the electronic invoices. The payment system 120 may also make use of functions performed by some applications included in the publication system 120.

The publication system 120 may include one or more social network application(s) 260.

Figure 3:
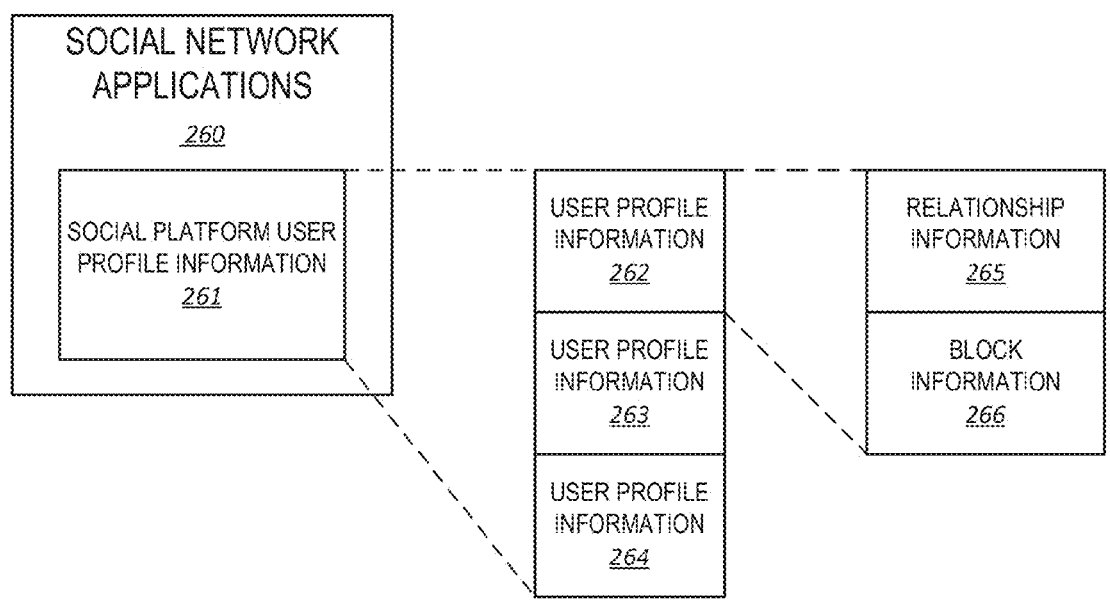
FIG. 3 is a block diagram illustrating a database, according to an example embodiment.

FIG. 3 is a block diagram illustrating social network application(s) 260 of FIG. 2, according to an embodiment, at the network-based social publisher 102 of FIG. 1. The social network application(s) 260 is shown to include social platform user profile information 261 that stores user profile information 262 for users of the network-based publisher 102. The user profile information 262 may include information related to the user and specifically may include relationship information 265 and block information 266. The relationship information 265 may store a predetermined relationship between the user associated with the user profile information 262 and other users on the network-based publisher 102. For example, a first user may be designated a "friend," or "favorite friend," etc. with a second user, the first user associated with the user profile information 262 and the respective designations associated with increasing levels of disclosure between the first user and second user. The block information 266 may store a configured preference of the user to block the addition of an item by other users to a watch list associated with the user.

Figure 4:
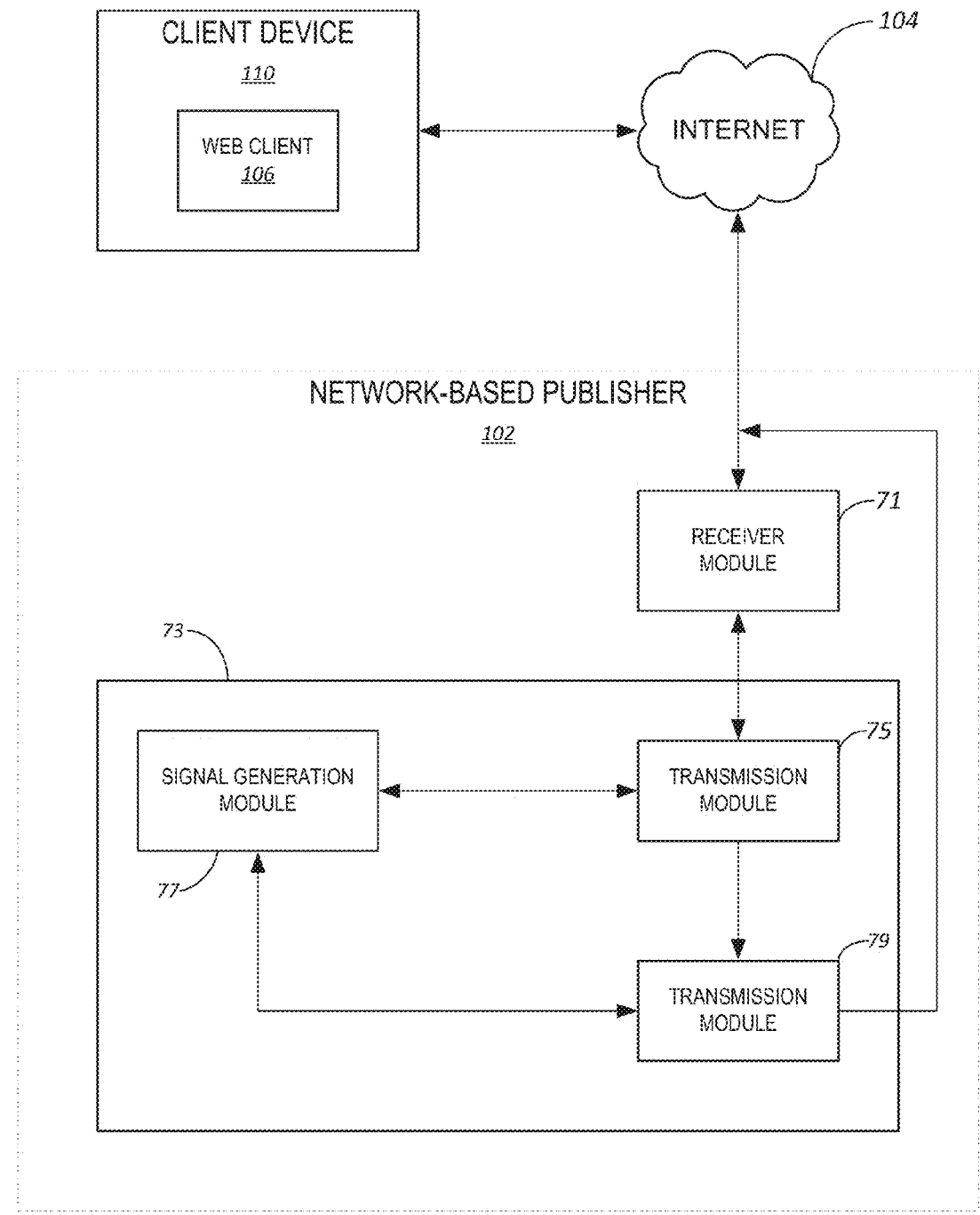
FIG. 4 is an illustration of a system usable with or as part of the system of FIG. 1.

Turning to FIG. 4, there is seen a system that forms part of the network-based publisher 102 of FIG. 1. The network-based publisher 102 is shown in part in the drawing to make it clear that the system forms only a part of the network-based publisher 102. The system includes a receiver module 71 for receiving signals from client machine 20, the signals identifying content to be transmitted to a social network server for storing at a message space of a user of the social network server. As used herein, "signals" could mean analog signals or digital signals such as web-based messages, including packet-based messages, or even a request message via an API call. Also included is analysis module 73. Analysis module 73 includes detector module 75 responsive to the receiver module 71 for detecting the content, the identity of the social network, and the identity of the user of the social network. The analysis module 73 also includes a signal generation module 77 coupled to the detector module 75 responsive to the detection of signals such as, for example, signals identifying the content, the identity of the social network, and the identity of the user of the social network, for whom the content is intended, and other types of signals.

The signal generation module 77 can provide a rendering signal for rendering at least the content of the received signal. This rendering signal is transmitted by transmission module 79 via network 104 to a social network, not shown. Alternatively, instead of transmitting signals via the network to a social network server, the transmission module 79 may transmit the signals, either via the network 104 or internally to the network-based publisher 102, to a social platform integrated within a network-based publisher 102. Further, the signals from signal generation module 77 may include signals such as signals requesting a user of the social network for an opinion about the content, or for outfit suggestions about the content, among other things, as more fully discussed below.

Figure 5:
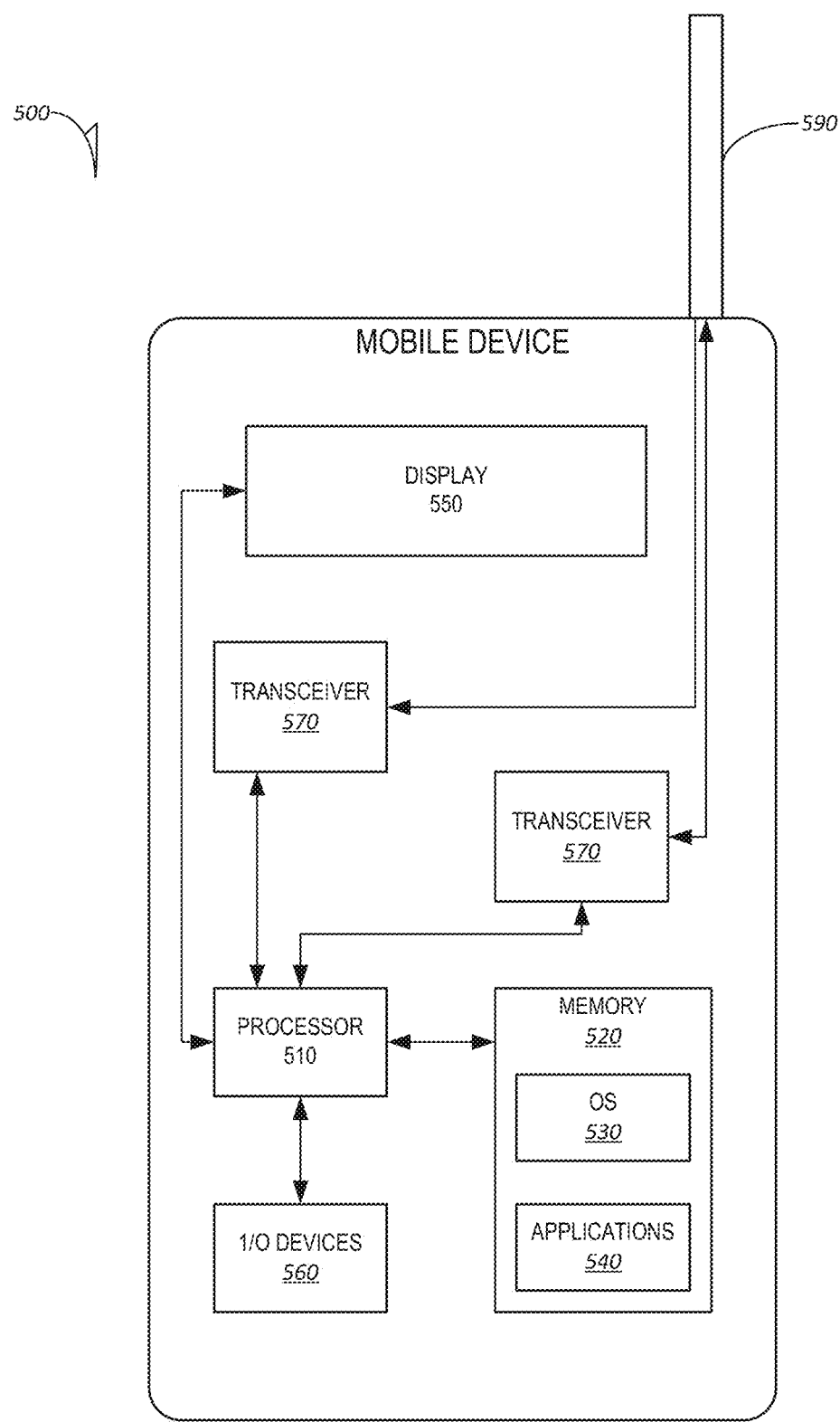
FIG. 5 is a block diagram illustrating a mobile device, according to an example embodiment.

FIG. 5 is a block diagram illustrating a mobile device 500, according to an example embodiment. The mobile device 500 may include a processor 510. The processor 510 may be any of a variety of different types of commercially available processors suitable for mobile devices (for example, an XScale architecture microprocessor, a Microprocessor without Interlocked Pipeline Stages (MIPS) architecture processor, or another type of processor). A memory 520, such as a Random Access Memory (RAM), a Flash memory, or other type of memory, is typically accessible to the processor. The memory 520 may be adapted to store an operating system (OS) 530, as well as application programs 540, such as a mobile location enabled application that may provide LBSs to a user. The processor 510 may be coupled, either directly or via appropriate intermediary hardware, to a display 550 and to one or more input/output (I/O) devices 560, such as a keypad, a touch panel sensor, a microphone, and the like. Similarly, in some embodiments, the processor 510 may be coupled to a transceiver 570 that interfaces with an antenna 590. The transceiver 570 may be configured to both transmit and receive cellular network signals, wireless data signals, or other types of signals via the antenna 590, depending on the nature of the mobile device 500. In this manner, a connection with a network such as network 104 of FIG. 1 may be established. Further, in some configurations, a GPS receiver 580 may also make use of the antenna 590 to receive GPS signals. Additional detail regarding providing and receiving location-based goods and services using a GPS system can be found in U.S. patent application Ser. No. 13/340,626 entitled "Methods and Systems for Using a Co-Located Group as an Authorization Mechanisms," assigned to the assignee of the instant application, which application is hereby incorporated by reference in its entirety.

Figure 6:
FIGS. 6 and 7 are illustrations of aspects of a mobile device on which the game may be played.
Figure 7:
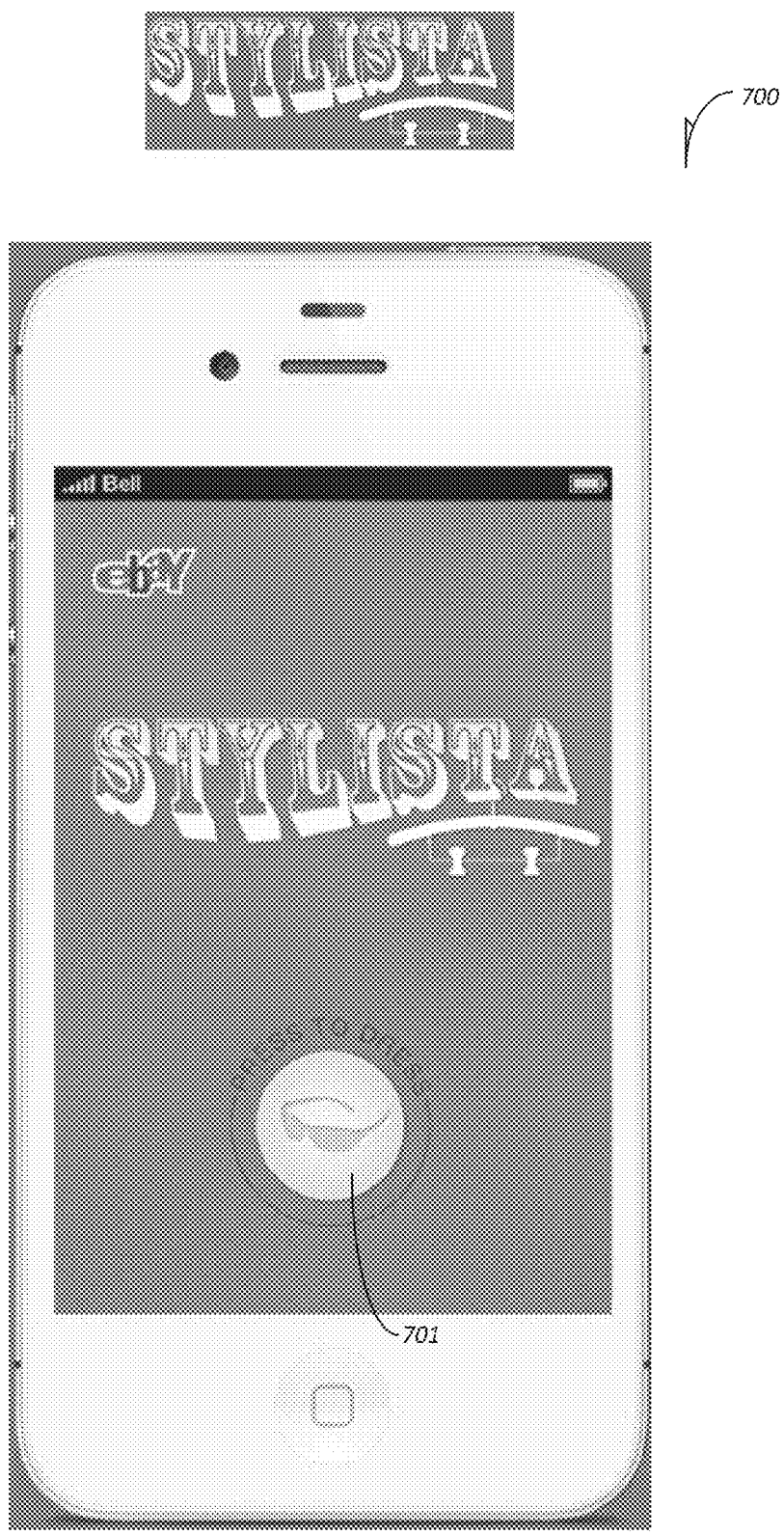

Turning now to FIG. 6 there is illustrated a mobile phone 600 to which the game has been downloaded. In one embodiment, a shortcut 601 has been placed on the screen of the mobile phone in order to launch an app for playing the game. When the app is launched a selectable start button such as at 701 of FIG. 7 may be pressed by the user to begin the game. The mobile phone camera mode should be turned on.

Figure 8:
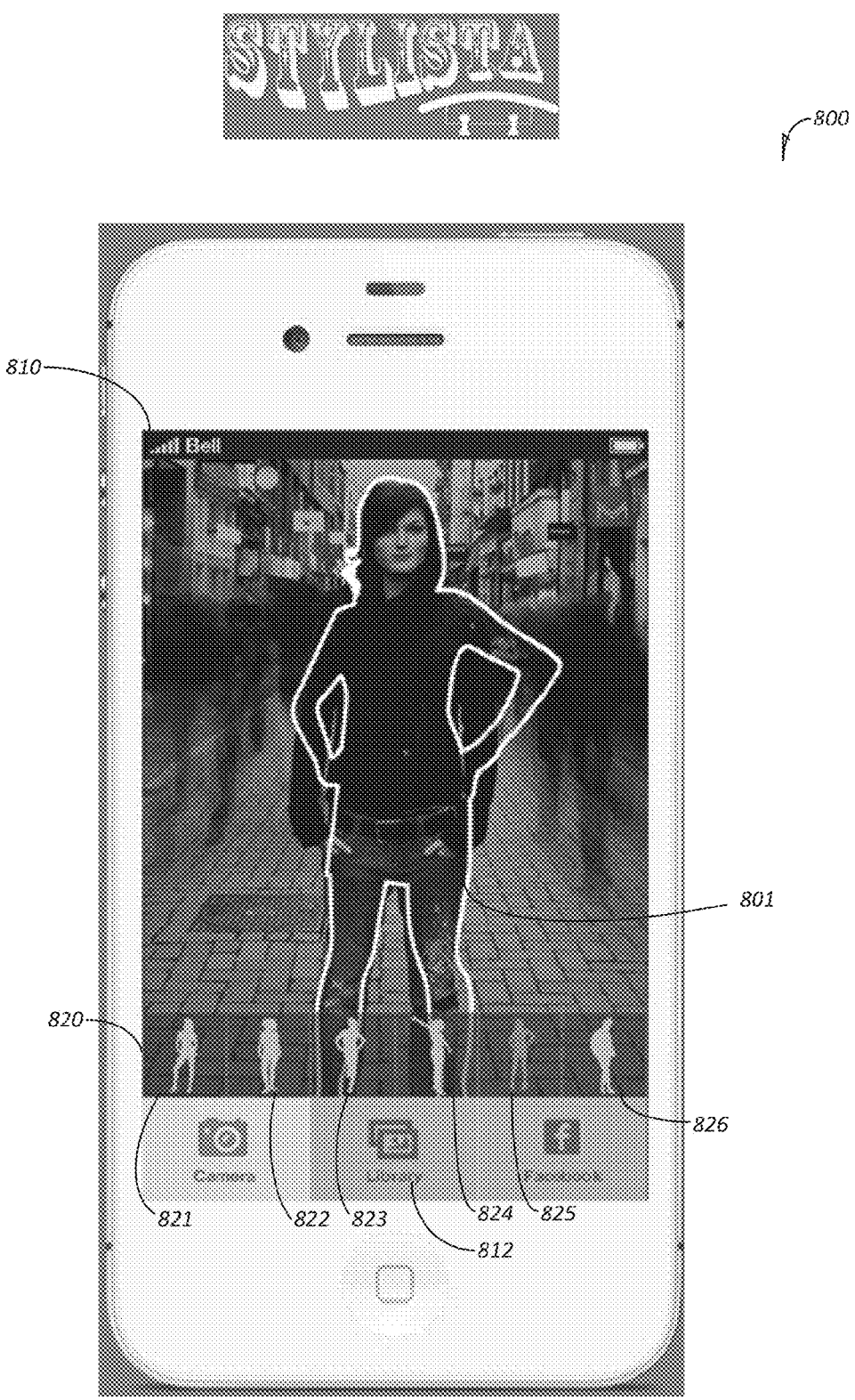
FIG. 8 is an illustration the posing process of a person who is the subject of the game.
Figure 9:
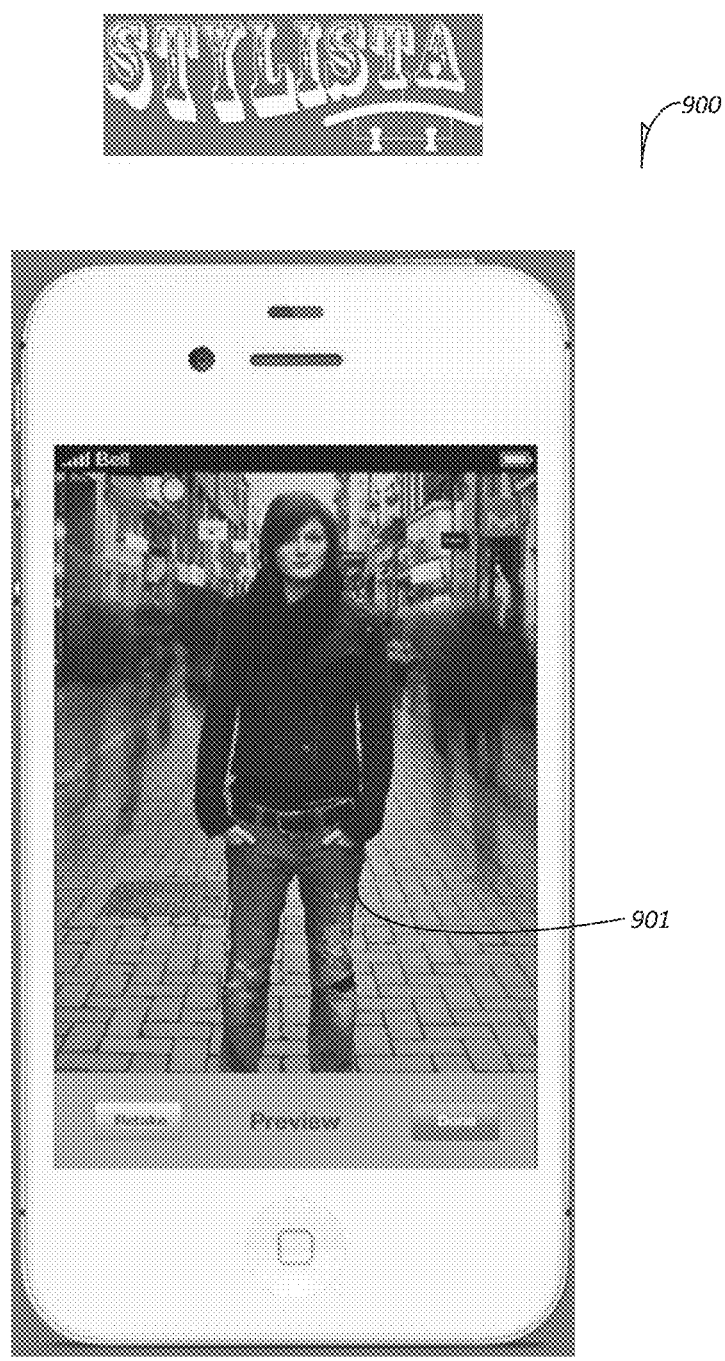
FIG. 9 is an illustration of the person in FIG. 8 in the photo to be used for the game.

The user may then ask a friend to be part of the game, for example, as the person who is to be the subject of the game. This may be seen in FIG. 8 where the subject poses for a photo as seen in the screen 810. The friend may be asked to strike various poses that may be used as the photo for the game. Examples of the poses may be seen at 820, and comprise photo's 821, 822 . . . 826, perhaps stored in a library, perhaps in silhouette format, and may be called using Library icon 812. The user may then select a desired pose, perhaps having it superimposed on the screen, for example pose 825, and then use that superimposed image on the screen as at 801 to pose the subject in the selected pose. The photo is then taken and the picture, now similar to the selected pose 825, in body shape, aspect, and angle, is seen at 901 of FIG. 9.

Figure 10:
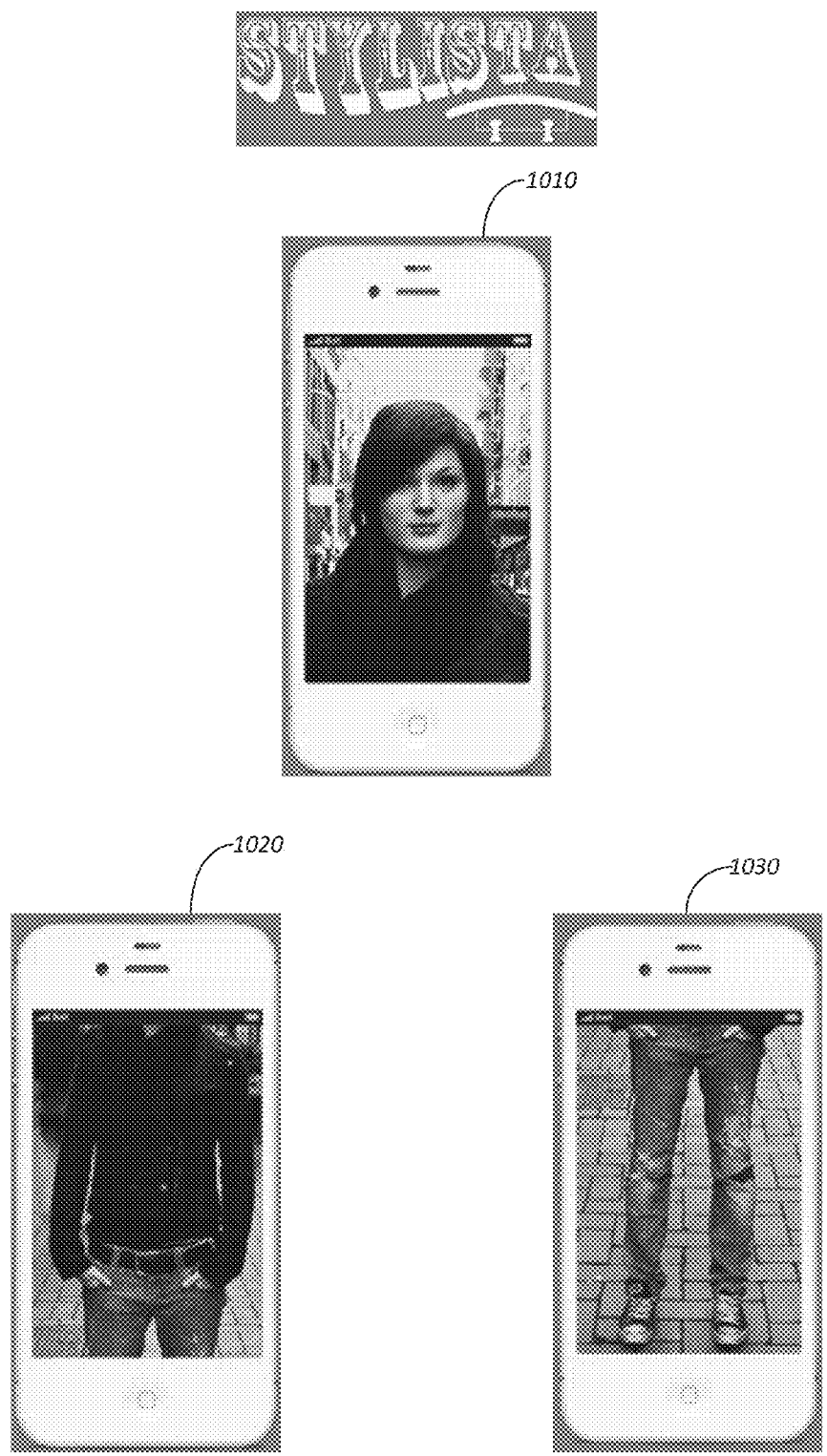
FIG. 10 illustrates component parts of the photo of the subject of the game.

The Stylista app may then break up, separate, or disassemble the photo of the body of the subject, 801, into three parts such as at 1010, 1020, and 1030 seen in one embodiment in FIG. 10. This may be accomplished by well-known means, one of which is discussed in U.S. patent application Ser. No. 13/841,528 entitled "User Interface Overlay application" which is assigned to the assignee of this application, and which is incorporated herein by reference in its entirety.

The players, or teams of players, each of which would receive a copy of a component such as 1020, (or a part of that component (i.e., a subcomponent) for each respective team member if teams are used), may then be invited to dress up the respective components of the photo. In another embodiment of team play, a member of a team may be provided that team's component, work on the component, and then pass on the component to the next member of the team to work on. Or each respective subcomponent may be worked on individually by each respective team member. If, on the other hand, individual players are playing, instead of teams, each individual player may work independently on his or her component. The dressing up may be done using clothing, shoes, and/or accessories. In one embodiment, players could use clothing from a catalog such as clothing offered for sale on an ecommerce site such as eBay The "dress up" could also include, for example, personal electronics such as the subject of the photo being shown listening to an iPod or speaking on a smart phone, or operating an iPad, as only some examples. Likewise, the background of the photo, in some instances, may be used to suggest items that the subject of the photo might find interesting or likable. For example, if the photo were a room, certain furniture might be suggested. If the background were a street, a bicycle might be suggested.

Sending invitations to play the game, as above, may be accomplished over social sites using well known means, for example as discussed in more detail in U.S. patent application Ser. No. 13/341,978 entitled "Social Shopping on a Networked Publication System" filed Dec. 31, 2011, assigned to the assignee of the present patent application, and incorporated herein by reference in its entirety.

In one example embodiment, the user may dress up the face of the subject of the photo, 1010, a second player may be asked to dress up the torso of the person in the photo, 1020, and another player may be asked to dress up the legs and feet portion of the photo, 1030. Each member of the game may dress up a component of the photo as discussed below, using the member's mobile device or, if desired, a laptop device or desktop device.

Figure 11:
FIG. 11 is an illustration of dressing up a component of the photo of the subject of the game.

In FIG. 11, the user who is dressing up the head of the subject might place sunglasses 1101A, eye shadow, lipsticks, wig, even a mustache for humor, and the like. As an example of suggesting products for dressing up the photo, the publication system may provide selections of products such as providing various types of sunglasses displayed on the device as at 1110. For example, and not shown on the drawing, the user may be provided with a user interface in which to make a query for a particular type of product and the publication system would then return types of those products at 1110. Such interfaces are well known in ecommerce systems and need not be discussed in detail here.

In this example there are three players dressing up the photo, namely the user and two friends, each of which dresses up one component of the photo, 1010, 1020, and 1030 of FIG. 10. Each of the two friends would dress up their component, 1020 and 1030, respectively, of the photo much like the user did as discussed for component 1010 in accordance with the description in FIG. 11. Once all members in the game have dressed up their photo components, the now-dressed photo components can be reassembled or, "folded out," as in FIG. 12. Reassembly of photo components, or reassembly of components of user interfaces, is well known and is discussed in more detail in the above referenced U.S. patent application Ser. No. 13/841,528 and elsewhere, and need not be discussed in detail here. When reassembled, the overall dress-up of the subject of the photo may be displayed concurrently to the three players. When the players view the completed photo, having worked only on their individual components, the end result is a surprise to the members.

Figure 12:
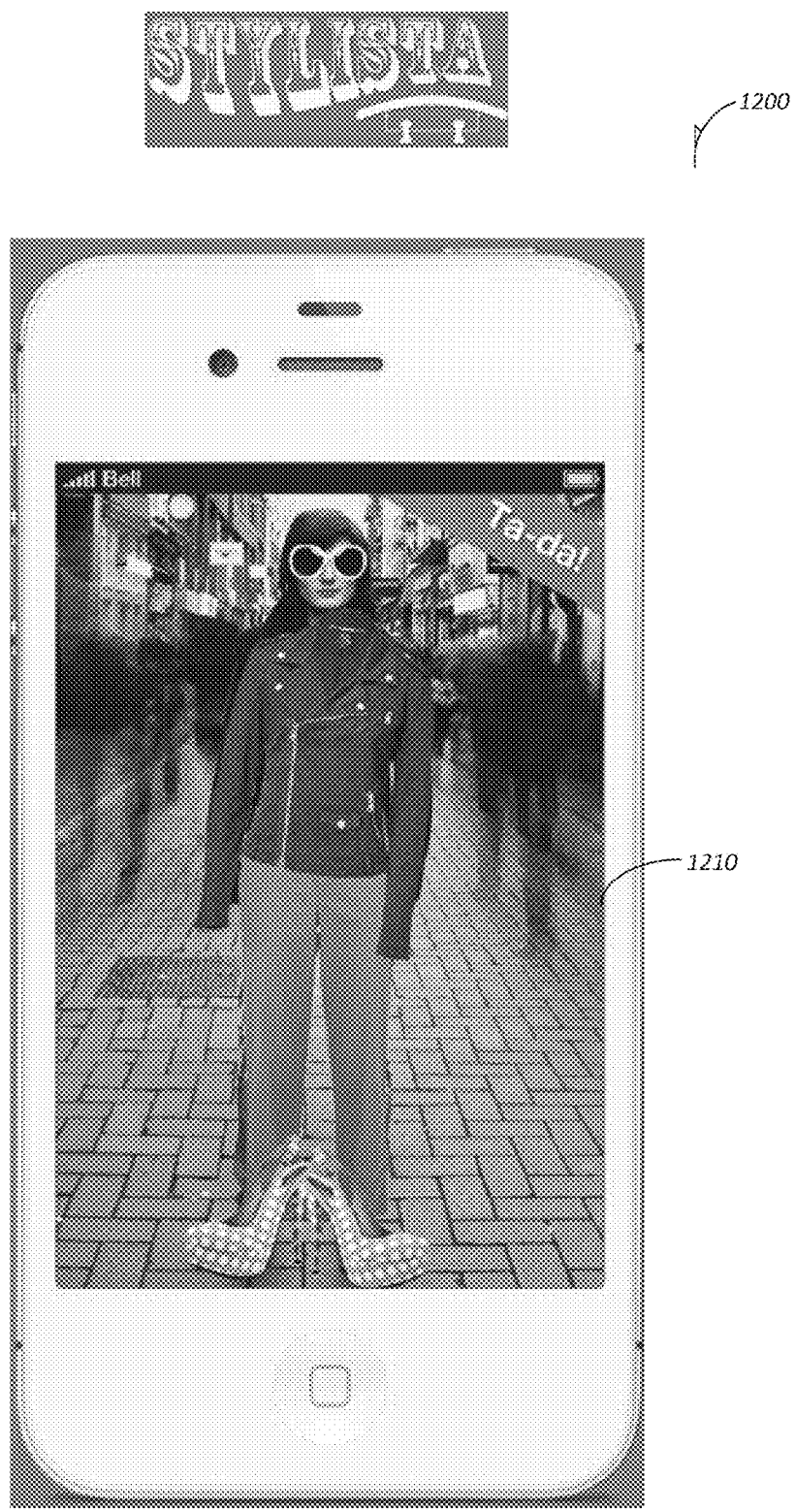
FIG. 12 is an illustration of the photo of FIG. 8 dressed up by the players.

In dressing up, for example, component 1020, here, a jacket as in FIG. 12, the jacket could be made to fit better as follows. Jacket styles would be displayed to the user much the same way in which the sunglasses were displayed at 1101 in FIG. 11. In one embodiment, the images, which in the case of FIG. 12 would be jackets, could be made adjustable. For example, when superimposed on the component, here 1020 of FIG. 10, the size of sleeve can be made shorter by adjustment, and the placement of the sleeves could be adjusted inward to better match the arms akimbo pose of 1020. Once adjusted, the jacket image could be made final by pressing or clicking on a selectable "Final" icon and the image is placed on the component 1020.

In another embodiment, team members may superimpose a photo of real clothing onto the component that the member is dressing up. As one example, the player may have the article of clothing itself and could place it on a table, folded or posed in the manner that the subject of the photo component, here 1020, is posed. A picture could then be taken of the article of clothing as so folded, and superimposed on the image component in order to match the pose. This superposition may be accomplished using the method and apparatus discussed in U.S. patent application Ser. No. 13/840,777 entitled "Crowd Sourcing and Machine Learning Size Mapper," filed Mar. 15, 2013, assigned to the assignee of the present patent application, and incorporated herein by reference in its entirety.

Figure 13:
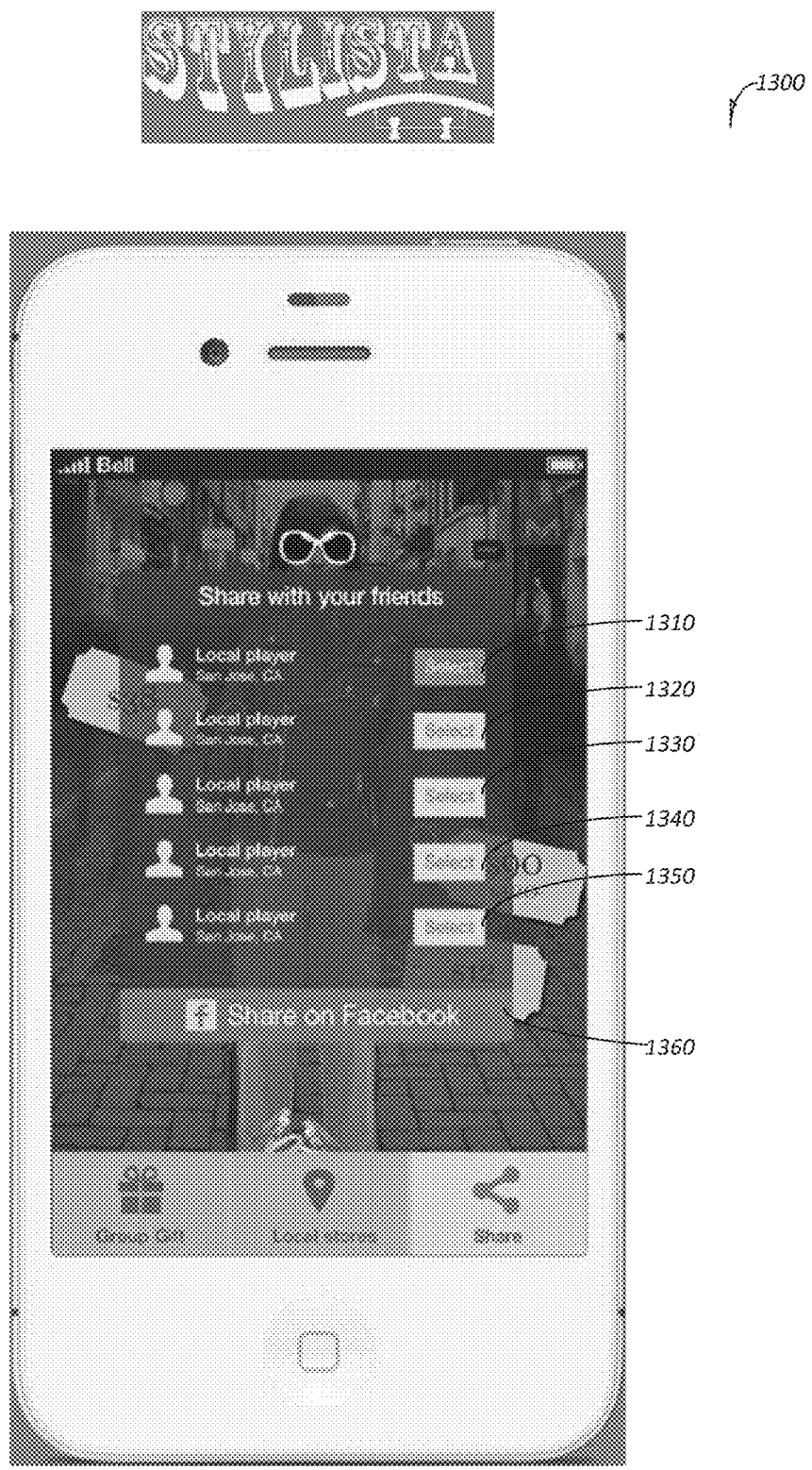
FIG. 13 is an illustration of aspects of the mobile device useable for sharing the photo on a social network.
Figure 14:
FIG. 14 is an illustration of how a shared photo would look on the wall of the friend with whom the photo is shared on a social network.

This game may be used to build brand awareness by the particular group that is likely to play the above game. When completed, the dressed up photo may be shared with friends on social network sites, for example by using select icons 1310 . . . 1360 of FIG. 13 for players or friends by posting the image on the person's wall. A view of how the image would look on the person's wall is seen in FIG. 14, with notation such as at 1410, 1420 indicating who shared the image and the various clothing shoes and accessories. At 1430 the name of the ecommerce site may be included to enhance brand awareness of the friends. Joint decisions may be made to purchase a gift of one or more of the items with which the photo is dressed up, for presentation to the subject of the photo, with the price being shared by the persons presenting the gift. The gift is not limited to the actual clothing in which the photo is dressed up. For example, alternate styles of the products in which the photo is dressed up may be presented by the publication system, as discussed in further detail below. In an alternate embodiment, if any one of the particular game participants would like to try on one of the dress-up items, the geo-positioning technology of the mobile device may be used to determine the location of a nearby store that carries the item. Locating local inventory for the item using the geo-positioning technology of a mobile device may be accomplished, in one embodiment, as discussed in U.S. patent application Ser. No. 13/019,910 entitled "Method and Process of Using Metadata Associated with a Digital Media to Search for Local Inventory," filed Feb. 2, 2011, assigned to the assignee of this patent application, and included herein by reference in its entirety.

Figure 15:
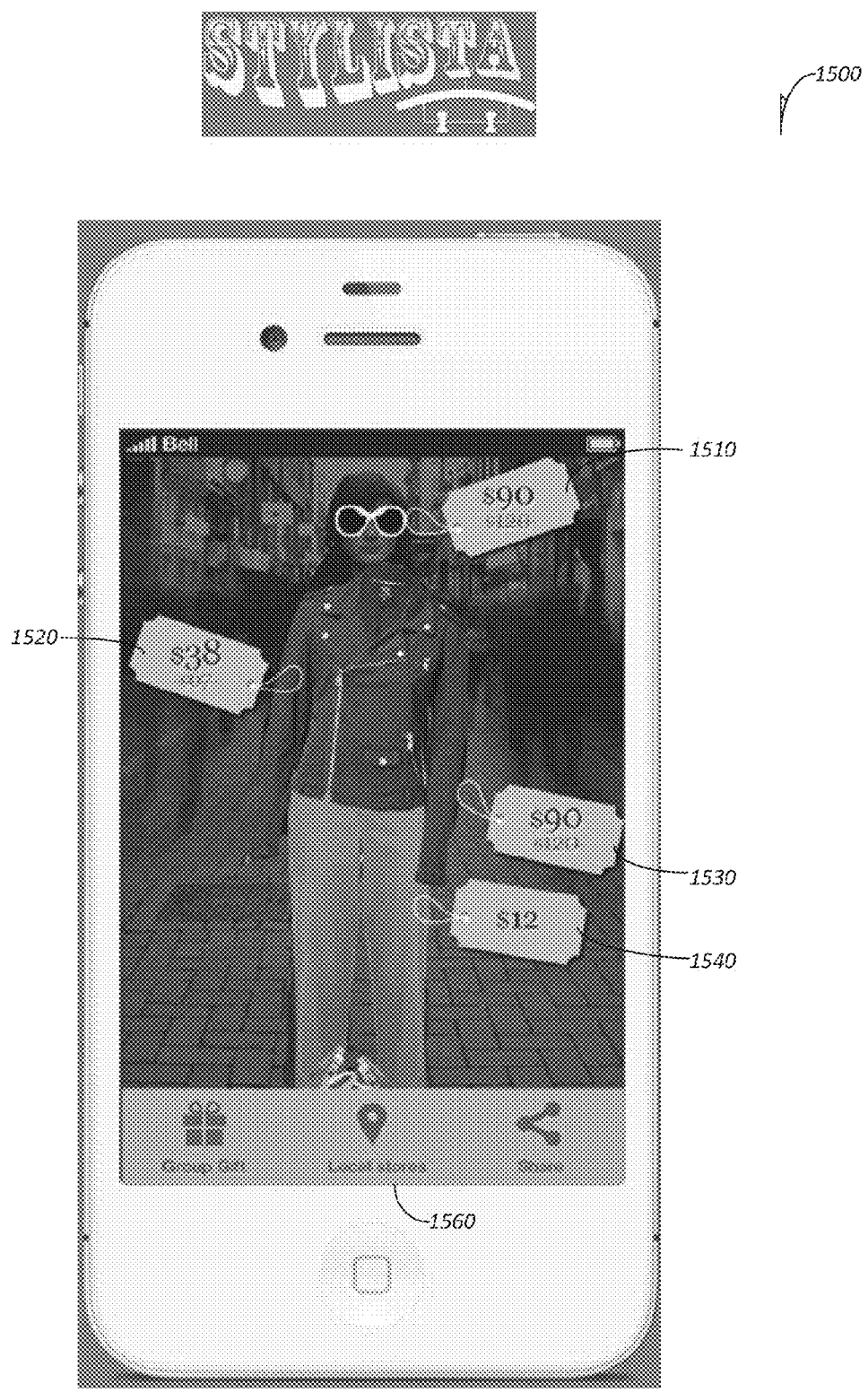
FIGS. 15 and 18 are illustrations of aspects of the mobile device for locating an item in inventory and its price, at a local store.
Figure 18:
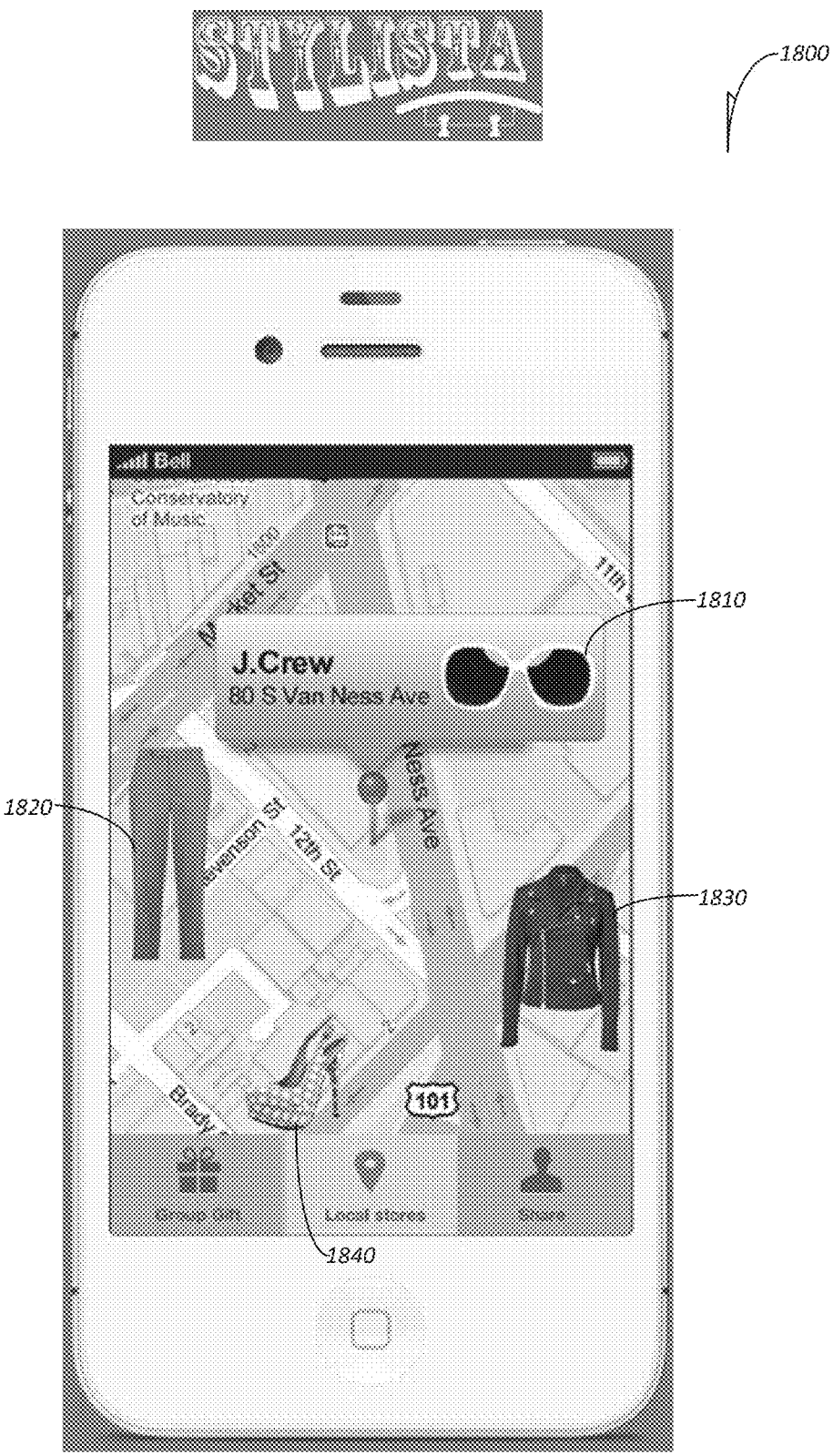

A selectable Local Stores icon may be provided as at 1560 and the brand, size, and other details of the jacket could be input (on a screen not shown in the drawing) and the name and location of the store, along with the price could be tagged onto the item of clothing, shoes or accessory as seen at 1510, 1520, and 1520 of FIG. 15. Further, location of local stores having the items in inventory may be shown by map as at FIG. 18 as at 1820, with the items located at the particular store indicated such as by icons 1810, 1820, 1830, and 1840. As mentioned above, such local sourcing may be accomplished using geo-positioning as discussed in more detail in U.S. patent application Ser. No. 13/019,910.

Figure 16:
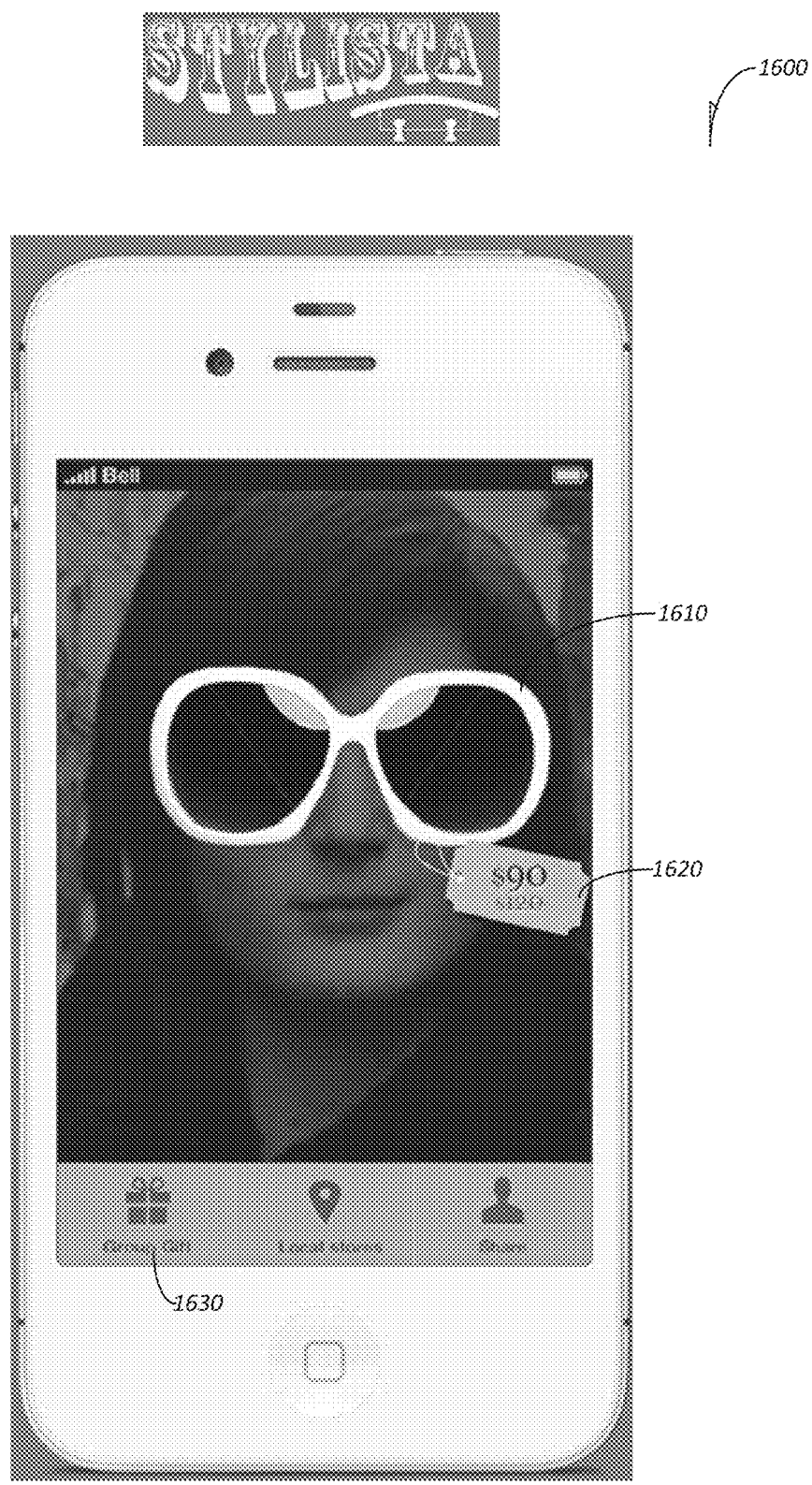
FIGS. 16 and 17 are illustrations of aspects of the mobile device for requesting that a group gift be purchased.
Figure 17:
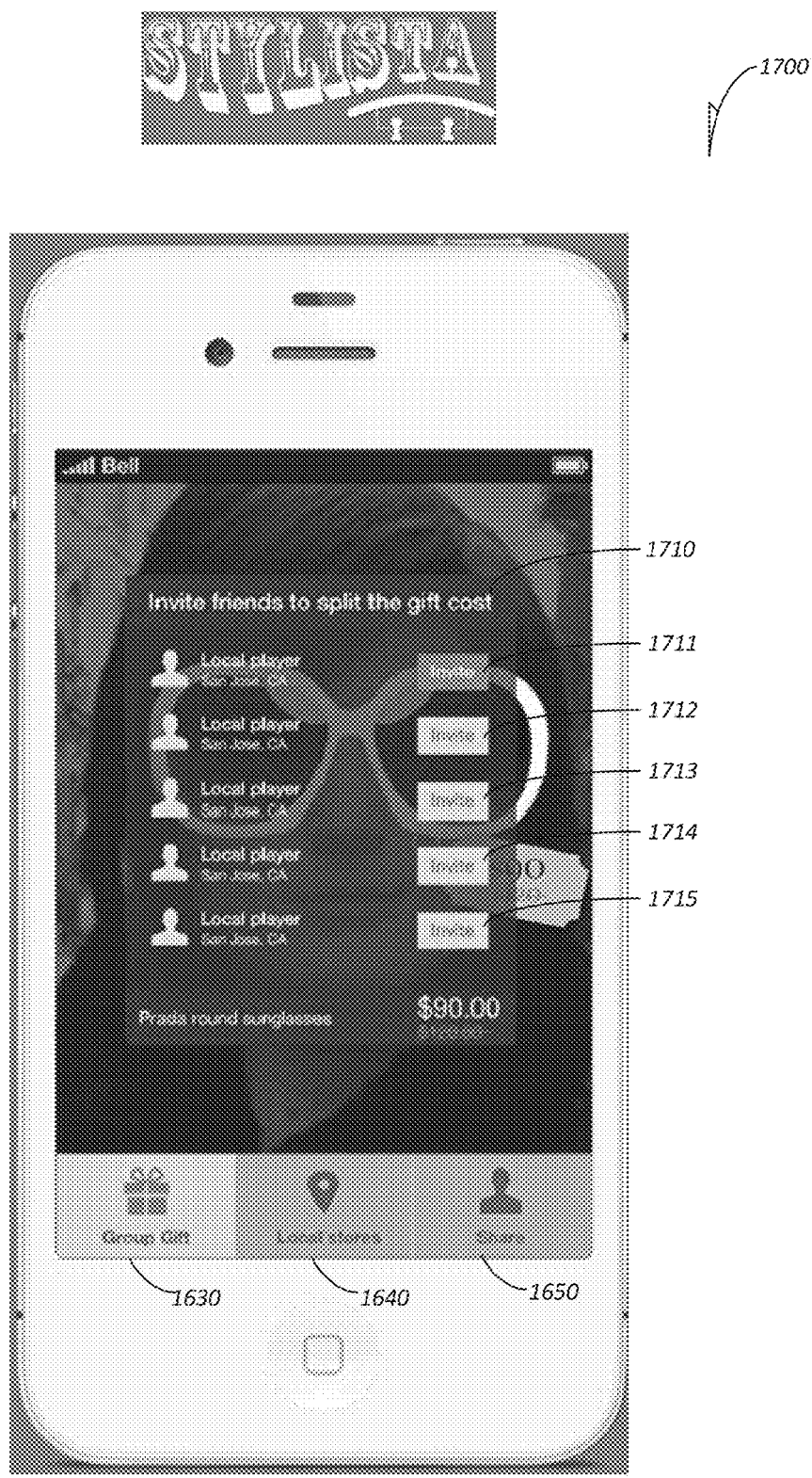

FIG. 16 illustrates an item that may be gifted to the subject of the photograph by friends as a group gift. The item 1610 is at the price illustrated in 1620. The group gift icon 1630 may be used to indicate to friends on the social network that a group gift request is being made. FIG. 17 illustrates inviting friend to share the gift cost. Initiation icons 1711 . . . 1725 can be used for this request, sending the invitation to the named players and/or friends.

Disclosed herein are network-based publisher 102 user transactions for playing a dress up game and sharing the results on a social networking platform, according to some example embodiments. As network-based marketplace user (e.g., an eBay user), a user can share purchases with friends so that the user may show new clothes to friends on a social networking platform (e.g., Facebook.com or a platform integration within a network-based publisher). In an embodiment a network-based publisher may be referred to as an ecommerce marketplace. These clothes, and other items similarly shared with friends as discussed herein, may be one example of "commercial items." For example, at the end of ecommerce marketplace checkout flow, the user may be provided with the ability to post her transaction involving a commercial item to a social network wall. This wall concept is sometimes referred to herein as "storage space," and could include renderable or viewable storage space. The user may tag a post with friends so that it shows up in their social graph(s). Tagging on social media is discussed in more detail in U.S. patent application Ser. No. 13/341,978 entitled "Social Shopping on a Networked Publication System" filed Dec. 31, 2011 and assigned to the assignee of the present patent application, and incorporated herein by reference in its entirety.

The post could include a picture and certain item information. Further, the friend could be provided with a user selectable "See similar" function to see similar pictures and item information. For example, there is a "See Similar' function on eBay's fashion page which can be located adjacent to the item listing, or the item's photo as a link. It could also be added as a contextual pop-up. The shared post could include selection like "commentable" or "likeable." These cases describe interactions that would feed into the social network, for example, Facebook. "Commentable" means that the marketplace user can share a particular product or item with his or her social graph via the Facebook Wall and include a comment along with it. "Likeable" means a Facebook user can provide a Facebook thumbs up if he or she likes the product or item. A social network user may also be able to provide a thumbs down if he or she doesn't like the product or item.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as may be known by a skilled artisan) as a module that operates to perform certain operations described herein.

In various embodiments, a module may be implemented mechanically or electronically. For example, a module may comprise dedicated circuitry or logic that may be permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that may be temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that may be physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it may be communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Storage Medium

Figure 19:
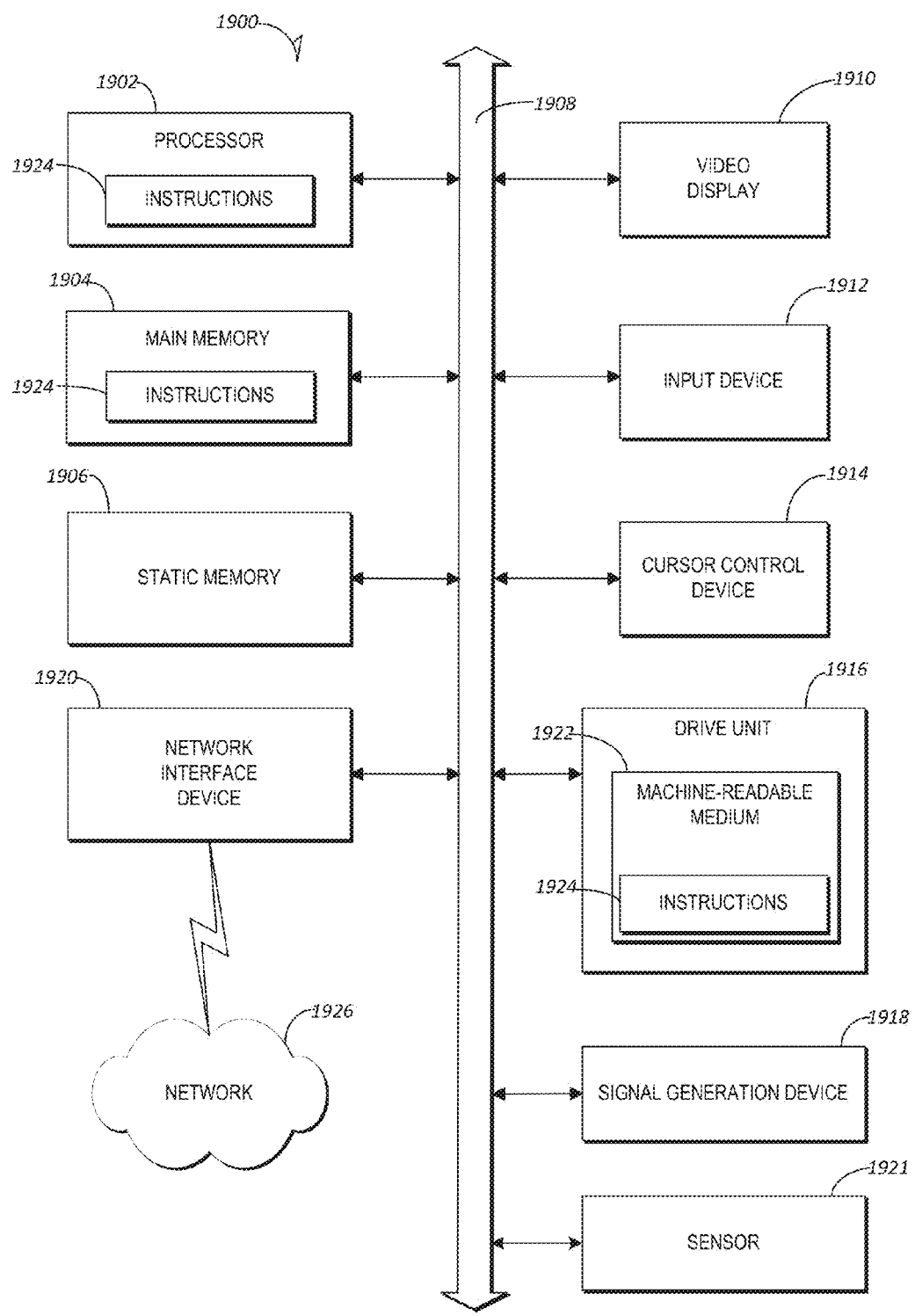
FIG. 19 is a diagrammatic representation of a machine in the example form of a computer system within which a set of instructions for causing the machine to perform any one or more of the methodologies discussed herein may be executed.

With reference to FIG. 19 an example embodiment extends to a machine in the example form of a computer system 1800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine may be illustrated, the term "machine" shall also be taken to include any collection of machines that individually or jointly execute a set (or multiple sets) of instructions to perform any one or more of the methodologies discussed herein.

The example computer system 1800 may include a processor 1802 (e.g., a central processing unit (CPU), a graphics processing unit (GPU) or both), a main memory 1804 and a static memory 1806, which communicate with each other via a bus 1807. The computer system 1800 may further include a video display unit 1810 (e.g., a liquid crystal display (LCD) or a cathode ray tube (CRT)). In example embodiments, the computer system 1800 also includes one or more of an alpha-numeric input device 1812 (e.g., a keyboard), a user interface (UI) navigation device or cursor control device 1814 (e.g., a mouse), a disk drive unit 1816, a signal generation device 1818 (e.g., a speaker), and a network interface device 1820.

Machine-Readable Medium

The disk drive unit 1816 includes a machine-readable storage medium 1822 on which may be stored one or more sets of instructions 1824 and data structures (e.g., software instructions) embodying or used by any one or more of the methodologies or functions described herein. The instructions 1824 may also reside, completely or at least partially, within the main memory 1804 or within the processor 1802 during execution thereof by the computer system 1800, with the main memory 1804 and the processor 1802 also constituting machine-readable media.

While the machine-readable storage medium 1822 may be shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that may be capable of storing, encoding, or carrying instructions for execution by the machine and that cause the machine to perform any one or more of the methodologies of embodiments of the present application, or that may be capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 1824 may further be transmitted or received over a communications network 1826 using a transmission medium via the network interface device 1820 and utilizing any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that may be capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present application. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, may be not to be taken in a limiting sense, and the scope of various embodiments may be defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present application. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present application as represented by the appended claims. The specification and drawings are, accordingly, to be regarded in an illustrative rather than a restrictive sense.

What is claimed is:

1. A method comprising:
receiving, from a client machine by at least one computer processor, an image of a subject;
electronically disassembling the image into a plurality of component images of the image of a subject;
transmitting, via a wireless communication channel, respective ones of the plurality of component images to client machines of respective individuals;
providing an electronically selectable inventory of items to the client machines of the respective individuals, the electronically selectable inventory including a plurality of images of a plurality of items for superposing on the component images transmitted to the client machine of each respective individual;
transmitting, via the wireless communication channel, a request to the client machine of each respective individual, the request requesting that individual to (i) select one of the plurality of images of one of the plurality of items from the electronically selectable inventory, and (ii) electronically superimpose the selected image of the item on the component image transmitted to that individual; receiving the respective ones of the plurality of component images from the client machines of the respective individuals with the selected images of the items electronically superimposed thereon;
electronically reassembling the plurality of component images with the selected images of the items superimposed thereon into the image of the subject;
transmitting, via the wireless communication channel, the electronically reassembled image of the subject with the selected images of the items superimposed thereon to the client machines of the respective individuals; and
transmitting, via the wireless communication channel, a request to purchase one or more of the items superimposed on the reassembled image of the subject, along with inventory and pricing information associated with those items, to the client machines of the respective individuals.

2. The method of claim 1 wherein the subject is posed in a desired pose.

3. The method of claim 2 further comprising adjusting a geometrical configuration of at least one of the items to match the desired pose.

4. The method of claim 1 wherein the image of the subject is received from a device which is a mobile device or a stationary device.

5. The method of claim 4 wherein the plurality of items is transmitted by a network based publisher and further comprising enabling the plurality of items to be selectively displayed on the device.

6. The method of claim 1 wherein the image of the subject is a photo of a person and the plurality of component images with items superimposed thereon are received responsive to a request to each respective individual to electronically dress the one of the plurality of component images transmitted to the individual.

7. The method of claim 1 wherein the respective individuals are associated with each other as friends on a social networking website and further comprising determining a geographic location of the client machine of at least one of the friends, wherein the inventory and pricing information associated with the one or more items superimposed on the reassembled image of the subject are detected locally to the geographic location of the client machine of the at least one of the friends.

8. The method of claim 1 wherein the items to be electronically superimposed comprise one of clothing, shoes, or accessories.

9. A system comprising:
one or more computer processors configured to execute instructions to:
receive, via a wireless communication channel, an image of a subject;
electronically disassemble the image into a plurality of components;
transmit respective ones of the plurality of components to client machines of respective individuals, via the wireless communication channel;
provide an electronically selectable inventory of items to the client machines of the respective individuals, the electronically selectable inventory including a plurality of images of a plurality of items for superposing on the component images transmitted to the client machine of each respective individual;

transmit, via the wireless communication channel, a request to a client machine of each respective individual, the request requesting that individual to (i) select one of the plurality of images of one of the plurality of items from the electronically selectable inventory, and (ii) electronically superimpose the selected image of the item on the component image transmitted to the individual;

receive the respective ones of the plurality of component images from the client machines of the respective individuals with the selected images of the items electronically superimposed thereon;

reassembling the plurality of component images with the selected images of the items superimposed thereon into the image of the subject;

transmit the reassembled image of the subject with the selected images of the items superimposed thereon to the client machines of the respective individuals, via the wireless communication channel; and transmit, via the wireless communication channel, a request to purchase one or more of the items superimposed on the reassembled image of the subject, along with inventory and pricing information associated with those items, to the client machines of the respective individuals.

10. The system of claim 9 wherein the subject is posed in a desired pose.

11. The system of claim 10 wherein the one or more computer processors is configured to execute instructions to adjust a geometrical configuration of at least one of the items to match the desired pose.

12. The system of claim 9 wherein the image of the subject is received from a device which is a mobile device or a stationary device.

13. The system of claim 12 wherein the plurality of items is transmitted by a network based publisher and the one or more computer processors is configured to execute instructions to enable the plurality of items to be selectively displayed on the device.

14. The system of claim 9 wherein the image of the subject is a photo of a person and the plurality of components with items superimposed thereon are received responsive to a request to each respective individual to dress the one of the plurality of component images transmitted to the individual.

15. The system of claim 9 wherein the respective individuals are associated with each other as friends on a social networking website and the one or more computer processors is configured to execute instructions to transmit a request to purchase one or more of the items, and to determine inventory and pricing information associated with the one or more items superimposed on the reassembled image of the subject, the inventory and pricing information are detected locally to the geographic location of the client machine of the at least one of the friends.

16. The system of claim 9 wherein the items to be electronically superimposed are selected from one of clothing, shoes, or accessories.

17. A non-transitory computer-readable hardware storage device having embedded therein a set of instructions which, when executed by one or more processors of a computer, causes the computer to execute the following operations:

receiving, from a client machine, by at least one computer processor, an image of a subject;

electronically disassembling the image into a plurality of component images of the image of a subject;

transmitting, via a wireless communication channel, respective ones of the plurality of component images to client machines of respective individuals;

providing an electronically selectable inventory of items to the client machines of the respective individuals, the electronically selectable inventory including a plurality of images of a plurality of items for superposing on the component images transmitted to the client machine of each respective individual;

transmitting, via the wireless communication channel, a request to the client machine of each respective individual, the request requesting that individual to: (i) select one of the plurality of images of one of the plurality of items from the electronically selectable inventory, and (ii) electronically superimpose the selected image of the item on the component image transmitted that individual;

receiving the respective ones of the plurality of component images from the client machines of respective individuals with the selected image of the items electronically superimposed thereon;

electronically reassembling the plurality of component images with the selected images of the items superimposed thereon into the image of the subject;

transmitting, via the wireless communication channel, the electronically reassembled image of the subject with the selected images of the items superimposed thereon to the client machines of the respective individuals; and transmitting, via the wireless communication channel, a request to purchase one or more of the items superimposed on the reassembled image of the subject, along with inventory and pricing information associated with those items, to the client machines of the respective individuals.

18. The non-transitory computer-readable hardware storage device of claim 17 wherein the subject is posed in a desired pose and the set of instructions which, when executed by one or more processors of a computer, causes the computer to execute adjusting a geometrical configuration of at least one of the items to match the desired pose.

19. The non-transitory computer-readable hardware storage device of claim 17 wherein the image of the subject is a photo of a person and the plurality of component images with items superimposed thereon are received responsive to a request to each respective individual to electronically dress the respective individual's one of the plurality of component images transmitted to the individual.

20. The non-transitory computer-readable hardware storage device of claim 17 wherein the respective individuals are associated with each other as friends on a social networking website and the set of instructions, when executed by one or more processors of a computer, causes the computer to execute determining a geographic location of the client machine of at least one of the friends, wherein the inventory and pricing information associated with one or more items superimposed on the reassembled image of the subject are detected locally to the geographic location of the client machine of the at least one of the friends.

* * * * *